United States Patent [19]
Miyamoto

[11] Patent Number: 5,838,662
[45] Date of Patent: Nov. 17, 1998

[54] SYSTEM AND METHOD FOR TRANSFERRING DATA

[75] Inventor: Naoyuki Miyamoto, Kawasaki, Japan

[73] Assignee: Fujitsu Limited, Kanagawa, Japan

[21] Appl. No.: 453,358

[22] Filed: May 30, 1995

[30] Foreign Application Priority Data

Sep. 26, 1994 [JP] Japan ................................ 6-229420

[51] Int. Cl.⁶ .............................. H04L 12/26; H04L 12/56
[52] U.S. Cl. ........................................ 370/230; 370/236
[58] Field of Search .................................. 370/14, 17, 60,
370/60.1, 84, 94.1, 94.2, 13, 230, 231,
235, 236, 395, 229, 468; 340/825.5, 825.51

[56] References Cited

U.S. PATENT DOCUMENTS

| | | | |
|---|---|---|---|
| 5,029,164 | 7/1991 | Goldstein et al. | 370/95.1 |
| 5,067,074 | 11/1991 | Farel et al. | 370/230 |
| 5,115,429 | 5/1992 | Hluchyj et al. | 370/94.3 |
| 5,253,247 | 10/1993 | Hirose et al. | 370/94.1 |
| 5,280,470 | 1/1994 | Buhrke et al. | 370/13 |
| 5,432,824 | 7/1995 | Zheng et al. | 370/84 |
| 5,446,734 | 8/1995 | Goldstein | 370/60.1 |
| 5,515,359 | 5/1996 | Zheng | 370/236 |

FOREIGN PATENT DOCUMENTS

| | | |
|---|---|---|
| 63-65730 | 3/1988 | Japan . |
| 5-136773 | 6/1993 | Japan . |
| 5-276217 | 10/1993 | Japan . |

*Primary Examiner*—Chau Nguyen
*Attorney, Agent, or Firm*—Helfgott & Karas, P.C.

[57] ABSTRACT

A data transfer system comprises a first communication device, a second communication device connected thereto via a first line, a third communication device connected thereto via a second line, and a fourth communication device connected thereto via a third line. The first communication device has a data transmission condition reception section for receiving a data transmission condition value for the up channel of the first line transmitted by the second communication device and a data transmission section for enabling data to be transmitted according to the data transmission condition received by the data transmission condition reception section.

31 Claims, 25 Drawing Sheets

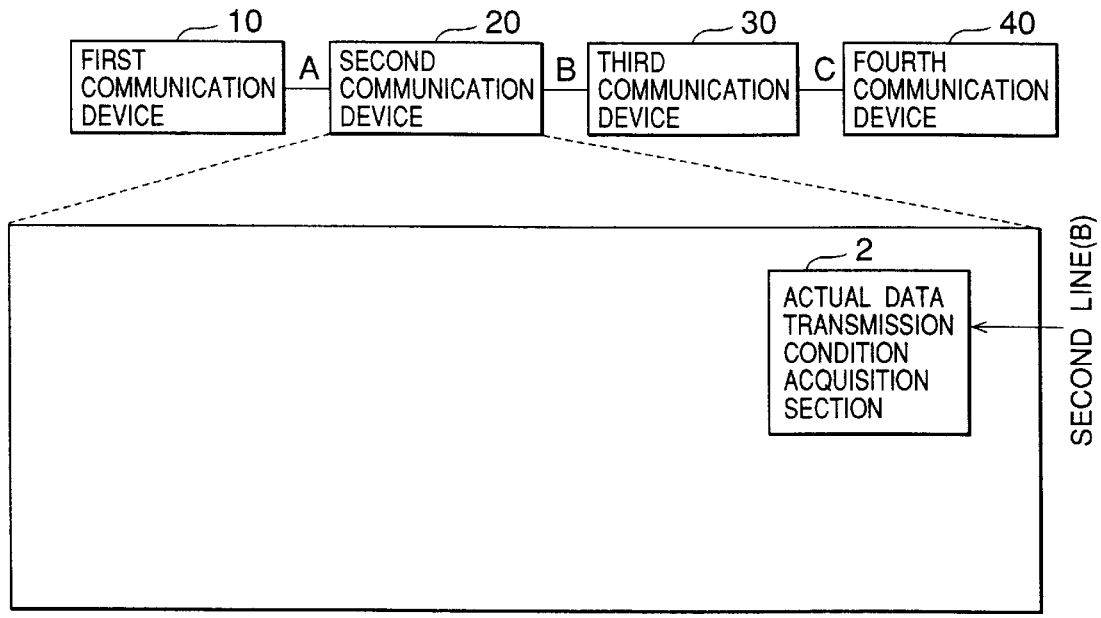
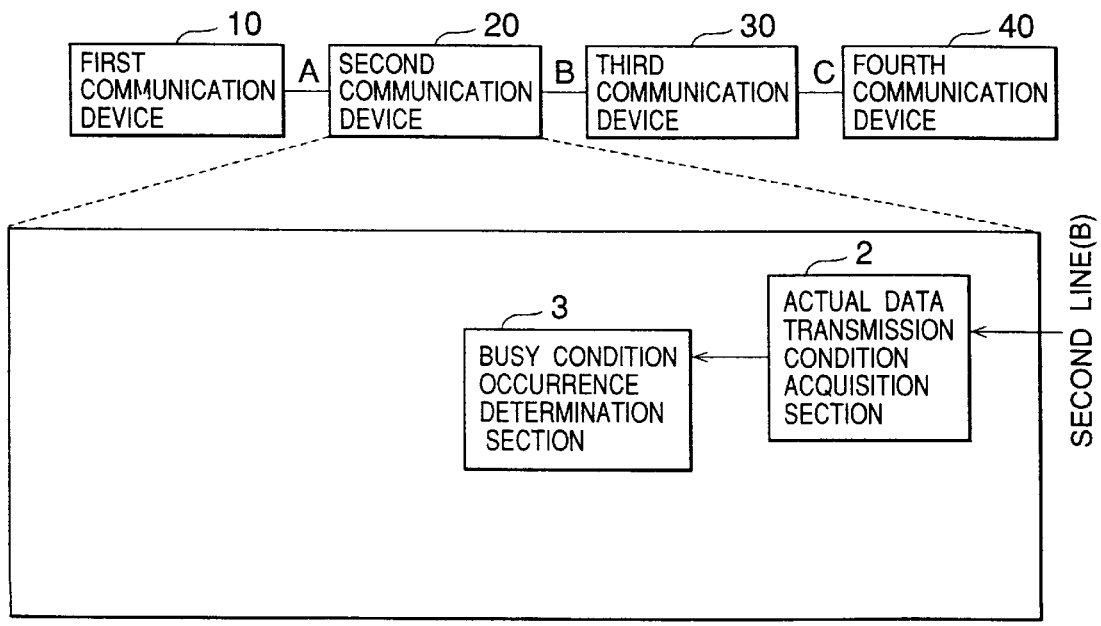

UI :USER INFORMATION
DTC :DATA TRANSMISSION CONDITON INFORMATION

UI : USER INFORMATION
DTC : DATA TRANSMISSION CONDITON INFORMATION

SYSTEM AND METHOD FOR TRANSFERRING DATA

BACKGROUND OF THE INVENTION

1. Field of the Invention

The present invention relates to a system and method for transferring data, and, in particular, to a system and method for transferring data which can prevent lines from becoming busy and still transfer data efficiently in a digital network such as an ATM network, a frame relay network, a circuit switching network, or a private line network.

2. Description of the Prior Art

In these days, terminals, which are sources for generating transmitted information, have capabilities of processing data, images, and sounds in various manners, for example, integrating or separating them. That is, the multimedia traffic in a digital network comprises various formes of transmissions of data such as continuous data and burst data of a high or a low density.

A large number of data transfer methods for digital networks as shown in the following (i) to (v) are being provided to address such transmission forms (see FIG. 38).

(i) Bit string transfer in a private line network (ii) Bit string transfer in a circuit switching network (including the ISDN)

(iii) Packet multiplex transfer (store and forward) in a packet exchange network (iv) Frame multiplex transfer in a frame relay network (v) Cell multiplex transfer in an ATM network The term "terminal device" in the following description and FIG. 21 and subsequent drawings means a host computer, a workstation, a personal computer, a CSMA/CD local area network (LAN), or a token ring LAN.

All of the data transfer methods in (i) to (v) require information to be transferred efficiently and economically under both normal and abnormal traffic conditions.

Communication and terminal devices perform the processing described in the following (1) and (2) to avoid the occurrence of a busy condition caused by abnormal traffic or to clear the busy condition promptly after its occurrence.

(1) Avoidance of the occurrence of a busy condition (a) Terminal and communication devices that receive data (referred to as "receiving devices" below) provide a statistical peak or average traffic value to users as a service condition standard.

Terminal and communication devices that transmit data (referred to as "transmitting devices" below) are set by users to operate within the range of service condition standards.

(b) Receiving devices has a large amount of memory for receiving data to prevent the occurrence of a busy condition even if traffic exceeding the service condition is input instantaneously. Receiving devices usually have such performance to permit an instantaneous increase in traffic.

(2) Clearance of a busy condition after its occurrence (a) A receiving device, when detecting the occurrence of a busy condition in itself, transmits to a transmission device information for simply informing that a busy condition is occurring (referred to as a "busy condition signalling" below).

Although this conventional method informs the transmitting device that a busy condition is occurring, it does not provide a specific condition on the reduction of the amount of data which is required to clear the busy condition. The transmitting device is responsible for this reduction.

(b) A transmitting device that has received a busy condition signal performs the processing described in the following 1) to 3).

1) Stop the transmission of data.

2) Reduce the amount of transmitted data based on its own determination.

3) Not restrain the amount of transmitted data but retransmit data when the receiving device abandons it.

As described above, since the prior art does not allow a receiving device to provide a transmitting device with a specific condition on the clearance of a busy condition (for example, phasing down of data), problems shown below may occur.

A first problem is that a transmitting device may repeat processing such as deactivating data transmission or phasing transmitted data down until it is informed of the clearance of the busy condition. That is, the busy condition continues, and the transmitting device must execute wasteful processing.

A second problem is that the busy condition will be cleared if a plurality of transmitting devices simultaneously stop transmitting data but that in this case, a busy condition may occur again if the receiving device informs the clearance of the busy condition and the transmitting devices simultaneously start transmitting data.

In view of these problems, it is an object of this invention to provide a method and system for transferring data which prevents the occurrence of a busy condition and still enables lines to be used efficiently in the data transfer between a receiving device and a transmitting device.

It is another object of this invention to provide a method and system for transferring data which enables a busy condition to be logically cleared in the data transfer between a receiving device and a transmitting device.

SUMMARY OF THE INVENTION

<First data transfer system of this invention>

A first data transfer system of this invention has the following configuration to solve the above first and second problems.

That is, this aspect is a data transfer system comprising a first communication device, a second communication device connected thereto via a first line (A), a third communication device connected thereto via a second line (B), and a fourth communication device connected thereto via a third line (C), wherein if the data transfer direction from the first communication device to the fourth communication device is defined as an up direction and the data transfer direction from the fourth communication device to the first communication device is defined as a down direction, the first communication device has:

a data transmission condition reception section for receiving a data transmission condition $(_u d_A, _u t_A)$ value for the up channel of the first line (A) which is transmitted by the second communication device; and a data transmitting section for enabling data transmission according to the data transmission condition $(_u d_A, _u t_A)$ received by the data transmission reception section (corresponding to claim 1).

As described, according to the first data transfer system of this invention, the data transmission condition reception section can receive the data transmission condition $(_u d_A, _u t_A)$ value for the up channel of the first line (A) which is transmitted by the second communication device. The data transmitting section can transmit data according to the data transmission condition ($_ud_A$, $_ut_A$) received by the data transmission reception section.

BRIEF DESCRIPTION OF THE DRAWINGS

FIG. 3 is a block diagram showing the principle of a fourth data transfer system;

FIG. 4 is a block diagram showing the principle of an eighth data transfer system;

DETAILED DESCRIPTION OF THE PREFERRED EMBODIMENT

Before explaining specific embodiments, the approximate configuration of this invention is described according to the means for solving the problems.

<First data transfer system of this invention>

Figure 1:
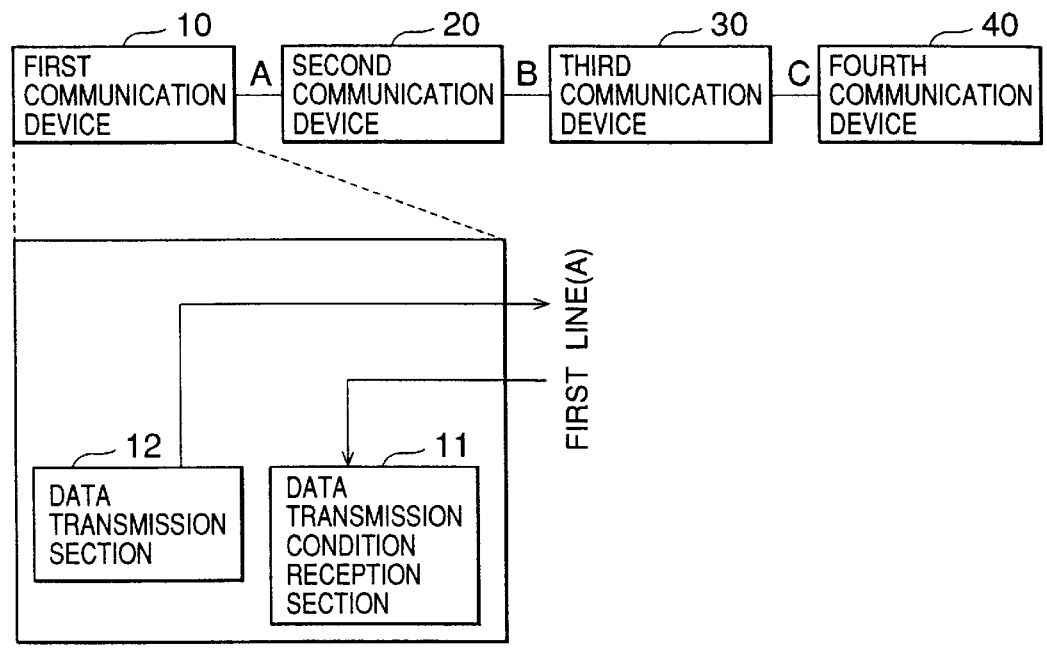
FIG. 1 is a block diagram showing the principle of a first data transfer system.

A first data transfer system of this invention has the following configuration to solve the above first and second problems. FIG. 1 is a block diagram showing the principle of the first data transfer system.

That is, this aspect is a data transfer system comprising a first communication device (10), a second communication device (20) connected thereto via a first line (A), a third communication device (30) connected thereto via a second line (B), and a fourth communication device (40) connected thereto via a third line (C), wherein if the data transfer direction from the first communication device (10) to the fourth communication device (40) is defined as an up direction and the data transfer direction from the fourth communication device (40) to the first communication device (10) is defined as a down direction, the first communication device (10) has:

a data transmission condition reception section (11) for receiving a data transmission condition ($_ud_A$, $_ut_A$) value for the up channel of the first line (A) which is transmitted by the second communication device (20); and a data transmitting section (12) for enabling data transmission according to the data transmission condition ($_ud_A$, $_ut_A$) received by the data transmission reception section (11) (corresponding to claim 1).

According to the first data transfer system of this invention, the data transmission condition reception section (11) can receive the data transmission condition ($_ud_A$, $_ut_A$) value for the up channel of the first line (A) which is transmitted by the second communication device (20). The data transmitting section (12) can transmit data according to the data transmission condition ($_ud_A$, $_ut_A$) received by the data transmission reception section (11).

A communication device in this invention means a data terminal equipment (DTE) or a communication control unit. This is applicable to a second to a thirty-eighth data transfer systems and a first to a sixteenth data transfer methods which are described below.

In addition, the data transmission condition (d,t) in this specification is marked with the subscripts listed in the following 1) to 9) as required.

1) Maximum: (d, t)→($d_m$, $t_m$)
2) Up channel: (d, t)→($u_d$, $u_t$)
3) Down channel: (d, t)→($d_d$, $d_t$)
4) Actual case: (d, t)→($d_r$, $t_r$)
5) Transmitted data less than the maximum amount: (d, t)→($d_s$, $t_s$)
6) To line A: (d, t)→($d_A$, $t_A$)
7) To line B: (d, t)→($d_B$, $t_B$)
8) To line C: (d, t) ($d_C$, $t_C$)
9) To, for example, arbitrary line A: (d, t)→($d_{Ai}$, $t_{Ai}$)

A plurality of the subscripts in 1) to 9) can be included in the data transmission condition. For example, the maximum data transmission on the up channel of line A can be represented as ($_ud_{Am}$, $_ut_{Am}$).

<Second data transfer system of this invention>

Figure 2:
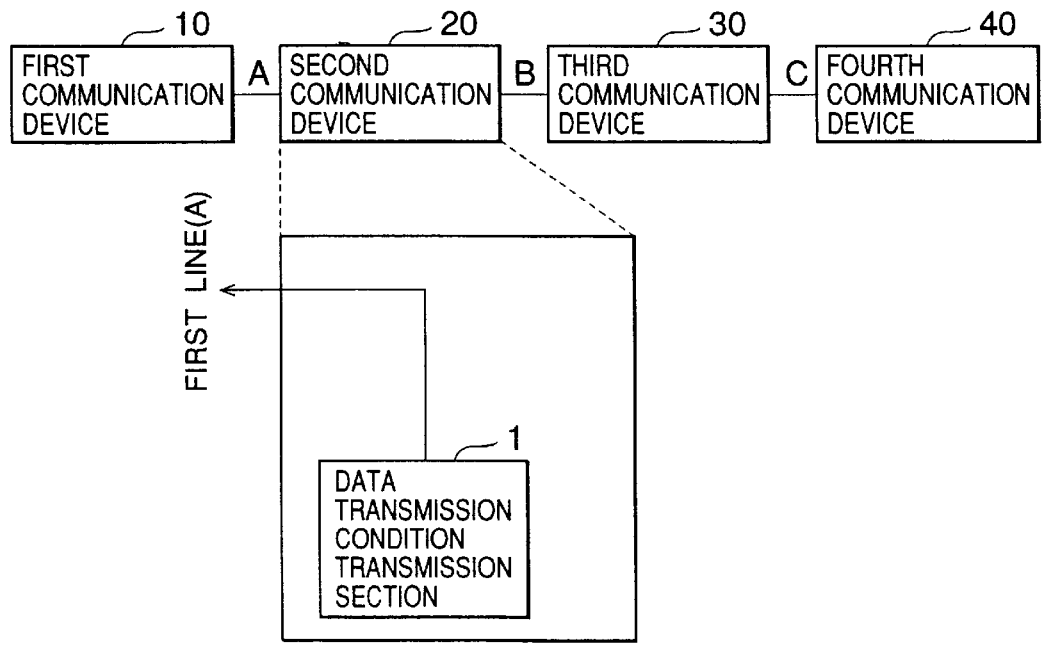
FIG. 2 is a block diagram showing the principle of a second data transfer system.

A second data transfer system of this invention has the following configuration to solve the above first and second problems. FIG. 2 is a block diagram showing the principle of the second data transfer system.

That is, this aspect is a data transfer system comprising a first communication device (10), a second communication device (20) connected thereto via a first line (A), a third communication device (30) connected thereto via a second line (B), and a fourth communication device (40) connected thereto via a third line (C), wherein if the data transfer direction from the first communication device (10) to the fourth communication device (40) is defined as an up direction and the data transfer direction from the fourth communication device (40) to the first communication device (10) is defined as a down direction, the second communication device (20) has a data transmission condition transmission section (1) for transmitting to the first communication device (10) a data transmission condition ($_ud_A$, $_ut_A$) value for the up channel of the first line (A) (corresponding to claim 2).

According to the second data transfer system of this invention, in addition to the operation of the first data transfer system, the data transmission condition transmission section can transmit the data transmission condition ($_ud_A$, $_ut_A$) value for the up channel of the first line (A) to the data transmission condition reception section (1) of the first communication device (10).

<Third data transfer system of this invention>

A third data transfer system of this invention has the following configuration to solve the above first and second problems.

That is, in the second data transfer system, the data transmission condition transmission section (1) of the second communication device (20) has a data transmission condition management table for storing the data transmission condition ($_ud_A$, $_ut_A$) value (corresponding to claim 3).

According to the third data transfer system, in addition to the operation of the second data transfer system, the data transmission condition transmission section (1) can manage the data transmission condition ($_ud_A$, $_ut_A$) value transmitted to a plurality of communication devices (10) using the data transmission condition management table for storing the transmitted data transmission condition ($_ud_A$, $_ut_A$).

<Fourth data transfer system of this invention>

A fourth data transfer system of this invention has the following configuration to solve the above first and second problems. FIG. 3 is a block diagram showing the principle of the fourth data transfer system.

That is, this aspect is a data transfer system comprising a first communication device (10), a second communication device (20) connected thereto via a first line (A), a third communication device (30) connected thereto via a second line (B), and a fourth communication device (40) connected thereto via a third line (C), wherein if the data transfer direction from the first communication device (10) to the fourth communication device (40) is defined as an up direction and the data transfer direction from the fourth communication device (40) to the first communication device (10) is defined as a down direction, the second communication device (20) has an actual data transmission condition acquisition section (2) for monitoring data transmitted on the up channel of the second line (B) using monitoring levels and obtaining an actual data transmission condition ($_ud_{Br}$, $_ut_{Br}$) value or obtaining an actual data transmission condition ($_ud_{Br}$, $_ut_{Br}$) value from a circuit for the up channel of the second line (B) of the communication device which recognizes digital signal, frame, and cell arrays to obtain the above value (corresponding to claim 4).

According to the fourth data transfer system of this invention, the actual data transmission condition acquisition section (2) can monitor data transmitted on the up channel of the second line (B) using monitoring levels and obtain the actual data transmission condition ($_ud_{Br}$, $_ut_{Br}$) value.

<Fifth data transfer system of this invention>

A fifth data transfer system of this invention has the following configuration to solve the above first and second problems.

That is, in the fourth data transfer system, the data transmission condition acquisition section (2) of the second communication device (20) provides electric synchronization in layer 1 and detects and identifies digital signal arrays (corresponding to claim 5).

According to the fifth data transfer system of this invention, the data transmission condition acquisition section (2) of the fourth data transfer system can provide electric synchronization in layer 1 and detect and identify digital signal arrays.

<Sixth data transfer system of this invention>

A sixth data transfer system of this invention has the following configuration to solve the above first and second problems.

That is, in the fourth data transfer system, the actual data transmission condition acquisition section (2) of the second communication device (20) detects and identifies frame arrays by detecting a flag in each frame (corresponding to claim 6).

According to the sixth data transfer system of this invention, the actual data transmission condition acquisition section (2) of the fourth data transfer system can detect and identify frame arrays by detecting a flag in each frame.

<Seventh data transfer system of this invention>

A seventh data transfer system of this invention has the following configuration to solve the above first and second problems.

That is, in the fourth data transfer system, the actual data transmission condition acquisition section (2) of the second communication device (20) detects and identifies cell arrays by detecting a header in each cell (corresponding to claim 7).

According to the seventh data transfer system of this invention, the actual data transmission condition acquisition section (2) of the fourth data transfer system can detect and identify cell arrays by detecting a header in each cell.

<Eighth data transfer system of this invention>

An eighth data transfer system of this invention has the following configuration to solve the above first and second problems. FIG. 4 is a block diagram showing the principle of the eighth data transfer system.

That is, in the fourth data transfer system, the second communication device (20) has a busy condition occurrence determination section (3) for comparing a maximum data transmission condition ($_u d_{Bm}$, $_u t_{Bm}$) value for the up channel of the second line (B) which is already stored in the communication device or the busy condition occurrence determination section (3) to an actual data transmission condition ($_u d_{Br}$, $_u t_{Br}$) value for the up channel of the second line (B) which is obtained by the actual data transmission condition acquisition section (2) to determine whether or not a busy condition is occurring on the up channel of the second line (B) and to obtain a value of the difference between the maximum data transmission condition ($_u d_{Br}$, $_u t_{Br}$) value and the actual data transmission condition ($_u d_{Br}$, $_u t_{Br}$) value (corresponding to claim 8).

According to the eighth data transfer system, in the first data transfer system, the busy condition occurrence determination section (3) of the second communication device (20) can compare the maximum data transmission condition ($_u d_{Bm}$, $_u t_{Bm}$) value for the up channel of the second line (B) to the actual data transmission condition ($_u d_{Br}$, $_u t_{Br}$) value for the up channel of the second line (B) which is obtained by the actual data transmission condition acquisition section (2) to determine whether or not a busy condition is occurring on the up channel of the second line (B) and to obtain a value of the difference between the maximum data transmission condition ($_u d_{Br}$, $_u t_{Br}$) value and the actual data transmission condition ($_u d_{Br}$, $_u t_{Br}$) value.

<Ninth data transfer system of this invention>

A ninth data transfer system of this invention has the following configuration to solve the above first and second problems.

That is, in the eighth data transmission system, the busy condition occurrence determination section (3) of the second communication device (20) calculates equation (1), $$_u d_{Bm} - _u d_{Br} = X \qquad (1)$$

and if in equation (1), X is 0 or +j that is a value representing a margin until the occurrence of a busy condition, calculates equation (2), $$(_u d_{Bm} + _u t_{Bm}) - (_u d_{Br} + _u t_{Br}) = Z \qquad (2)$$

and if in equation (2), Z is 0 or +p that represents a margin until the occurrence of a busy condition, determines that a busy condition is not occurring, and if in equation (1), X is −k that represents a negative quantity, calculates equation (3), $$(_u d_{Bm}, _u t_{Bm}) - (_u d_{Br} + _u t_{Br}) = Y \qquad (3)$$

and if in equation (3), Y is 0 or +m that represents a margin until the occurrence of a busy condition, determines that a busy condition is not occurring, and if in equation (3), Y is −n that represents a negative quantity or if in equation (2), Z is −q that represents a negative quantity, determines that a busy condition is occurring (corresponding to claim 9).

According to the ninth data transfer system of this invention, in the eighth data transfer system, the busy condition occurrence determination section (3) can determine a value of the difference between X and Y and Z to make comparison and to determine whether or not a busy condition is occurring using the following steps 1 to 6.

[Step 1]

Calculate equation (1).

$$_u d_{Bm} - _u d_{Br} = X \qquad (1)$$

[Step 2]

If in equation (1), X is 0 or +j that is a value representing a margin until the occurrence of a busy condition, calculate equation (2).

$$(_u d_{Bm} + _u t_{Bm}) - (_u d_{Br} + _u t_{Br}) = Z \qquad (2)$$

[Step 3]

If in equation (2), Z is 0 or +p that represents a margin until the occurrence of a busy condition, determine that a busy condition is not occurring.

[Step 4]

If in equation (1), X is −k that represents a negative quantity, calculate equation (3).

$$(_u d_{Bm} + _u t_{Bm}) - (_u d_{Br} + _u t_{Br}) = Y \qquad (3)$$

[Step 5]

If in equation (3), Y is 0 or +m that represents a margin until the occurrence of a busy condition, determine that a busy condition is not occurring.

[Step 6]

If in equation (3), Y is −n that represents a negative quantity or if in equation (2), Z is −q that represents a negative quantity, determine that a busy condition is occurring.

<Tenth data transfer system of this invention>

Figure 5:
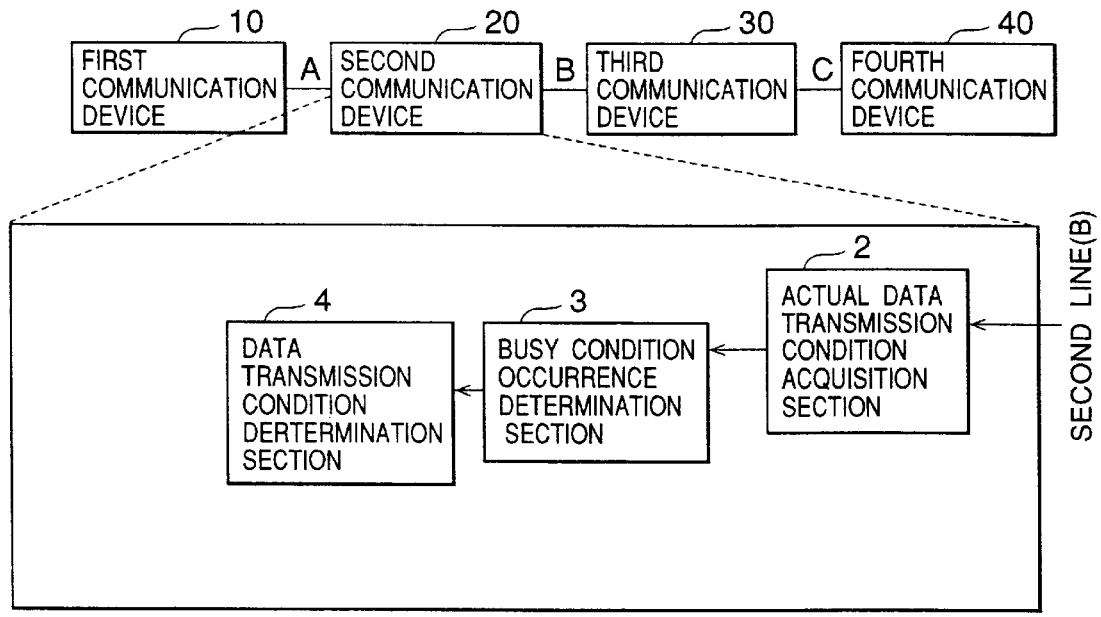
FIG. 5 is a block diagram showing the principle of a tenth data transfer system.

A tenth data transfer system of this invention has the following configuration to solve the above first and second problems. FIG. 5 is a block diagram showing the principle of the tenth data transfer system.

That is, in the eighth data transfer system, the second communication device (20) has a data transmission condition determination section (4) for determining a data transmission condition ($d_A$, $t_A$) for the up channel of the first line (A) which allows data to be transferred efficiently without causing a busy condition in the data transfer on the up channel of the second line (B), based on the results output by the busy condition occurrence determination section (3) and using a specified allocation criteria, and sends this value to the data transmission condition transmission section (1) (corresponding to claim 10).

According to the tenth data transfer system, the data transmission condition determination section (4) of the second communication device (20) can determine a data transmission condition ($d_A$, $t_A$) for the up channel of the first line (A) which allows data to be transferred efficiently without causing a busy condition in the data transfer on the up channel of the second line (B), based on the results output by the busy condition occurrence determination section (3) and using a specified allocation criteria.

<Eleventh data transfer system of this invention>

An eleventh data transfer system of this invention has the following configuration to solve the above first and second problems.

That is, in the tenth data transfer system, the data transmission condition determination section (4) of the second communication device (20) uses instead of the maximum data transmission condition ($_ud_{Am}$, $_ut_{Am}$) a safe data transmission condition ($_ud_{Bs}$, $_ut_{Bs}$) with a larger margin on the safer side than the maximum data transmission condition ($_ud_{Am}$, $_ut_{Am}$) (corresponding to claim 11).

According to the eleventh data transfer system, the data transmission condition determination section (4) of the tenth data transfer system can use instead of the maximum data transmission condition ($_ud_{Am}$, $_ut_{Am}$) the safe data transmission condition ($_ud_{Bs}$, $_ut_{Bs}$) with a larger margin on the safer side than the maximum data transmission condition ($_ud_{Am}$, $_ut_{Am}$).

<Twelfth data transfer system of this invention>

A twelfth data transfer system of this invention has the following configuration to solve the above first and second problems.

That is, in the tenth data transfer system, if data transmitted across the up channel of the first line (A) can occupy the up channel of the second channel (B), the data transmission condition determination section (4) of the second communication device (20) adopts as the specified allocation criteria, the relationship $$_ud_{Ai} + _ut_{Ai} = _ud_{Bs} + _ut_{Bs}$$

wherein $_ud_{Ai}$, $_ut_{Ai}$, $_ud_{Bs}$, and $_ut_{Bs}$ are data length time in a data transmission condition for the up channel of the first line (A), a data transmission time interval in a data transmission condition for the up channel of the first line (A), data length time in a data transmission condition for the up channel of the second line (B), and a data transmission time interval in a data transmission condition for the up channel of the second line (B), respectively (corresponding to claim 12).

According to the twelfth data transfer system, if data transmitted across the up channel of the first line (A) can occupy the up channel of the second channel (B), the data transmission condition determination section (4) of the tenth data transfer system adopts as the specified allocation criteria, the relationship $$_ud_{Ai} + _ut_{Ai} = _ud_{Bs} + _ut_{Bs}.$$

<Thirteenth data transfer system of this invention>

A thirteenth data transfer system of this invention has the following configuration to solve the above first and second problems.

That is, in the tenth data transfer system, if data transmitted across the up channel of the (n) first lines (A) can occupy the up channel of the second line (B), the data transmission condition determination section (4) of the second communication device (20) adopts as the specified allocation criteria, the relationship $$\Sigma(_ud_{Ai} + _ut_{Ai}) = _ud_{Bs} + _ut_{Bs}$$

wherein $_ud_{Ai}$, $_ut_{Ai}$, $_ud_{Bs}$ and $_ut_{Bs}$, are data length time in a data transmission condition for the up channel of the i-th first line (A), a data transmission time interval in a data transmission condition for the up channel of the i-th first line (A), data length time in a data transmission condition for the up channel of the second line (B), and a data transmission time interval in a data transmission condition for the up channel of the second line (B), respectively (corresponding to claim 13).

According to the thirteenth data transfer system, if data transmitted across the up channel of the (n) first line (A) can occupy the up channel of the second line (B), the data transmission condition determination section (4) of the tenth data transfer system adopts as the specified allocation criteria, the relationship $$\Sigma(_ud_{Ai} + _ut_{Ai}) = _ud_{Bs} + _ut_{Bs}.$$

<Fourteenth data transfer system of this invention>

A fourteenth data transfer system of this invention has the following configuration to solve the above first and second problems.

That is, in the thirteenth data transfer system, the sum of $_ud_{Ai}$ and $_ut_{Ai}$ is determined by the following uniform relationship, $$(_ud_{A1} + _ut_{A1}) = (_ud_{A2} + _ut_{A2}) = \ldots = (_ud_{Ai} + _ut_{Ai}) = (_ud_{An} + _ut_{An}).$$

According to the fourteenth data transfer system, in the thirteenth data transfer system, the sum of $_ud_{Ai}$ and $_ut_{Ai}$ is determined by the following uniform relationship, $$(_ud_{A1} + _ut_{A1}) = (_ud_{A2} + _ut_{A2}) = \ldots = (_ud_{Ai} + _ut_{Ai}) = (_ud_{An} + _ut_{An}).$$

<Fifteenth data transfer system of this invention>

A fifteenth data transfer system of this invention has the following configuration to solve the above first and second problems.

That is, in the thirteenth data transfer system, the sum of $_ud_{Ai}$ and $_ut_{Ai}$ is given in such a way that the ordinal relationship is reflected in $\Sigma d_{Ai}$ that is the sum of the amount of data bits transmitted per unit time (corresponding to claim 15).

According to the fifteenth data transfer system, in the thirteenth data transfer system, the sum of $_ud_{Ai}$ and $_ut_{Ai}$ is given in such a way that the ordinal relationship is reflected in $\Sigma d_{Ai}$ that is the sum of the amount of data bits transmitted per unit time.

<Sixteenth data transfer system of this invention>

A sixteenth data transfer system of this invention has the following configuration to solve the above first and second problems.

That is, in the fifteenth data transfer system, the sum of udAi and utAi has its ordinal relationship established based on the performance of the first communication device (10) (corresponding to claim 16).

The "performance" stated above means 1) the size of a data buffer for transmission and reception for the communication device and 2) the level of the capabilities of data transmission and reception (the speed at which the buffer can be emptied).

According to the sixteenth data transfer system, in the fifteenth data transfer system, the sum of $_ud_{Ai}$ and $_ut_{Ai}$ has its ordinal relationship established based on the performance of the first communication device (10).

<Seventeenth data transfer system of this invention>

A seventeenth data transfer system of this invention has the following configuration to solve the above first and second problems.

That is, in the fifteenth data transfer system, the sum of $_ud_{Ai}$ and $_ut_{Ai}$ has its ordinal relationship established based on the operation of the first communication device (10) (corresponding to claim 17).

The "operation" stated above means a priority established for each communication device, and communication devices with a higher priority deal with information for which transfer should be completed promptly.

According to the seventeenth data transfer system, in the fifteenth data transfer system, the sum of $_ud_{Ai}$ and $_ut_{Ai}$ has its ordinal relationship established based on the operation of the first communication device (10).

<Eighteenth data transfer system of this invention>

An eighteenth data transfer system of this invention has the following configuration to solve the above first and second problems.

That is, in the fifteenth data transfer system, the sum of $_u d_{Ai}$ and $_u t_{Ai}$ has its ordinal relationship established based on the performance of the fourth communication device (40) (corresponding to claim 18).

The "performance" stated above means 1) the size of a data buffer for transmission and reception for the communication device and 2) the level of the capabilities of data transmission and reception (the speed at which the buffer can be emptied).

According to the eighteenth data transfer system, in the fifteenth data transfer system, the sum of $_u d_{Ai}$ and $_u t_{Ai}$ has its ordinal relationship established based on the performance of the fourth communication device (40).

<Nineteenth data transfer system of this invention>

A nineteenth data transfer system of this invention has the following configuration to solve the above first and second problems.

That is, in the fifteenth data transfer system, the sum of $_u d_{Ai}$ and $_u t_{Ai}$ has its ordinal relationship established based on the operation of the fourth communication device (40) (corresponding to claim 19).

The "operation" stated above means a priority established for each communication device, and communication devices with a higher priority deal with information for which transfer should be completed promptly.

According to the nineteenth data transfer system, in the fifteenth data transfer system, the sum of $_u d_{Ai}$ and $_u t_{Ai}$ has its ordinal relationship established based on the operation of the fourth communication device (40).

<Twentieth data transfer system of this invention>

A twentieth data transfer system of this invention has the following configuration to solve the above first and second problems.

That is, in the fifteenth data transfer system, the sum of $_u d_{Ai}$ and $_u t_{Ai}$ has its ordinal relationship established based on the performance of the first line (A) (corresponding to claim 20).

The "performance" stated above means 1) the line speed, 2) the line propagation delay time, and 3) the magnitude of line bit errors.

According to the twentieth data transfer system, in the fifteenth data transfer system, the sum of $_u d_{Ai}$ and $_u t_{Ai}$ has its ordinal relationship established based on the performance of the first line (A).

<Twenty-first data transfer system of this invention>

A twenty-first data transfer system of this invention has the following configuration to solve the above first and second problems.

That is, in the fifteenth data transfer system, the sum of $_u d_{Ai}$ and $_u t_{Ai}$ has its ordinal relationship established based on the operation of the first line (A) (corresponding to claim 21).

The "operation" stated above means a priority established for each line, and lines with a higher priority deal with information for which transfer should be completed promptly.

According to the twenty-first data transfer system, in the fifteenth data transfer system, the sum of $_u d_{Ai}$ and $_u t_{Ai}$ has its ordinal relationship established based on the operation of the first line (A).

<Twenty-second data transfer system of this invention>

A twenty-second data transfer system of this invention has the following configuration to solve the above first and second problems.

That is, in the fifteenth data transfer system, the sum of $_u d_{Ai}$ and $_u t_{Ai}$ has its ordinal relationship established based on the performance of the third line (C) (corresponding to claim 22).

The "performance" stated above means 1) the line speed, 2) the line propagation delay time, and 3) the magnitude of line bit errors.

According to the twenty-second data transfer system, in the fifteenth data transfer system, the sum of $_u d_{Ai}$ and $_u t_{Ai}$ has its ordinal relationship established based on the performance of the third line (C).

<Twenty-third data transfer system of this invention>

A twenty-third data transfer system of this invention has the following configuration to solve the above first and second problems.

That is, in the fifteenth data transfer system, the sum of $_u d_{Ai}$ and $_u t_{Ai}$ has its ordinal relationship established based on the operation of the third line (C) (corresponding to claim 23).

The "operation" stated above means a priority established for each line, and lines with a higher priority deal with information for which transfer should be completed promptly.

According to the twenty-second data transfer system, in the fifteenth data transfer system, the sum of $_u d_{Ai}$ and $_u t_{Ai}$ has its ordinal relationship established based on the operation of the third line (C).

<Twenty-fourth data transfer system of this invention>

A twenty-fourth data transfer system of this invention has the following configuration to solve the above first and second problems.

That is, in the fifteenth data transfer system, the sum of $_u d_{Ai}$ and $_u t_{Ai}$ has its ordinal relationship established based on the operation of the second line (B) (corresponding to claim 24).

The "performance" stated above means 1) the line speed, 2) the line propagation delay time, and 3) the magnitude of line bit errors.

According to the twenty-fourth data transfer system, in the fifteenth data transfer system, the sum of $_u d_{Ai}$ and $_u t_{Ai}$ has its ordinal relationship established based on the performance of the second line (B).

<Twenty-fifth data transfer system of this invention>

A twenty-fifth data transfer system of this invention has the following configuration to solve the above first and second problems.

That is, in the fifteenth data transfer system, the sum of $_u d_{Ai}$ and $_u t_{Ai}$ has its ordinal relationship established based on the operation of the second line (B) (corresponding to claim 25).

The "operation" stated above means a priority established for each line, and lines with a higher priority deal with information for which transfer should be completed promptly.

According to the twenty-fifth data transfer system, in the fifteenth data transfer system, the sum of $_u d_{Ai}$ and $_u t_{Ai}$ has its ordinal relationship established based on the operation of the second line (B).

<Twenty-sixth data transfer system of this invention>

A twenty-sixth data transfer system of this invention has the following configuration to solve the above first and second problems.

That is, in the fifteenth data transfer system, the sum of $_u d_{Ai}$ and $_u t_{Ai}$ has its ordinal relationship established based on the data transmission time for the first communication device (10) (corresponding to claim 26).

According to the twenty-sixth data transfer system, in the fifteenth data transfer system, the sum of $_u d_{Ai}$ and $_u t_{Ai}$ has its ordinal relationship established based on the data transmission time for the first communication device (10).

<Twenty-seventh data transfer system of this invention>

A twenty-seventh data transfer system of this invention has the following configuration to solve the above first and second problems.

That is, in the fifteenth data transfer system, the sum of $_u d_{Ai}$ and $_u t_{Ai}$ has its ordinal relationship established based on the data reception time for the fourth communication device (40) (corresponding to claim 27).

According to the twenty-seventh data transfer system, in the fifteenth data transfer system, the sum of $_u d_{Ai}$ and $_u t_{Ai}$ has its ordinal relationship established based on the data reception time for the fourth communication device (40).

<Twenty-eighth data transfer system of this invention>

Figure 6:
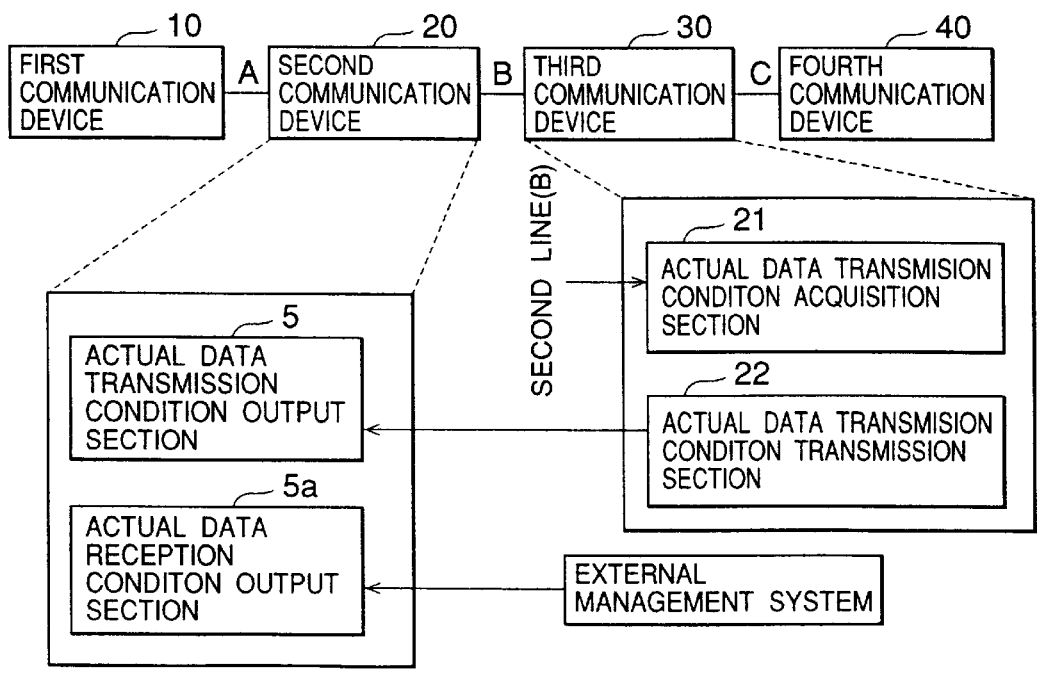
FIG. 6 is a block diagram showing the principle of a twenty-eighth data transfer system.

A twenty-eighth data transfer system of this invention has the following configuration to solve the above first and second problems. FIG. 6 is a block diagram showing the principle of the twenty-eighth data transfer system.

That is, this aspect is a data transfer system comprising a first communication device (10), a second communication device (20) connected thereto via a first line (A), a third communication device (30) connected thereto via a second line (B), and a fourth communication device (40) connected thereto via a third line (C), wherein if the data transfer direction from the first communication device (10) to the fourth communication device (40) is defined as an up direction and the data transfer direction from the fourth communication device (40) to the first communication device (10) is defined as a down direction, the third communication device (30) has an actual data transmission condition acquisition section (21) for obtaining an actual data transmission condition ($_u d_{BR}$, $_u t_{Br}$) value from a circuit for the up channel of the second line (B) which monitors received data to detect the above value (corresponding to claim 28).

According to the twenty-eighth data transfer system of this invention, the actual data transmission condition acquisition section (21) of the third communication device (30) can monitor data received from the up channel of the second line (B) to obtain the actual data transmission condition ($_u d_{Br}$, $_u t_{Br}$) value.

<Twenty-ninth data transfer system of this invention>

A twenty-ninth data transfer system of this invention has the following configuration to solve the above first and second problems.

That is, in the twenty-eighth data transfer system, the third communication device (30) has an actual data transmission condition transmission section (22) for transmitting to the second communication device (20) the actual data transmission condition ($_u d_{Br}$, $_u t_{Br}$) value obtained by the actual data transmission condition acquisition section (21) (corresponding to claim 29).

According to the twenty-ninth data transfer system, in the twenty-eighth data transfer system, the actual data transmission condition transmission section (22) of the third communication device (30) transmits to the second communication device (20) the actual data transmission condition ($_u d_{Br}$, $_u t_{Br}$) value obtained by the actual data transmission condition acquisition section (21).

<Thirtieth data transfer system of this invention>

A thirtieth data transfer system of this invention has the following configuration to solve the above first and second problems.

That is, in the eighth data transfer system, the second communication device (20) has instead of the actual data transmission condition acquisition section (2) an actual data transmission condition acquisition section (5) for receiving an actual data transmission condition ($_u d_{Br}$, $_u t_{Br}$) value transmitted from the actual data transmission control transmission section (22) of the third communication device (30) and outputting it to the busy condition occurrence determination section (3) (corresponding to claim 30).

According to the thirtieth data transfer system, in the eighth data transfer system, the actual data transmission condition acquisition section (5) of the second communication device (20) can receive the actual data transmission condition ($_u d_{Br}$, $_u t_{Br}$) value transmitted from the actual data transmission control transmission section (22) of the third communication device (30) and output it to the busy condition occurrence determination section (3).

<Thirty-first data transfer system of this invention>

A thirty-first data transfer system of this invention has the following configuration to solve the above first and second problems.

That is, in the eighth data transfer system, the second communication device (20) has instead of the actual data transmission condition acquisition section (2) an actual data reception condition output section (5a) for receiving the actual reception condition ($_u d_{Br}$, $_u t_{Br}$) of the up channel of the second line (B) which is monitored and measured by an externally installed management system and outputting it to the busy condition occurrence determination section (3) (corresponding to claim 31).

According to the thirty-first data transfer system, in the eighth data transfer system, the actual data transmission condition output section (5a) of the second communication device (20) can receive the actual reception condition ($_u d_{Br}$, $_u t_{Br}$) of the up channel of the second line (B) which is monitored and measured by the externally installed management system and output it to the busy condition occurrence determination section (3).

<Thirty-second data transfer system of this invention>

Figure 7:
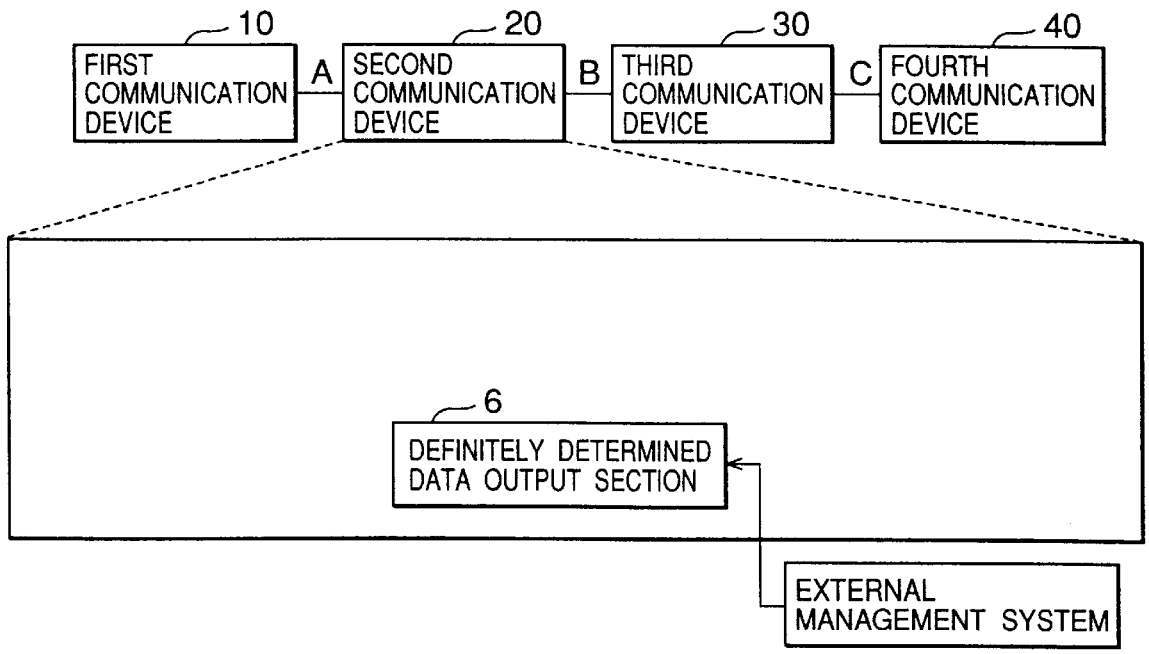
FIG. 7 is a block diagram showing the principle of a thirty-second data transfer system.

A thirty-second data transfer system of this invention has the following configuration to solve the above first and second problems. FIG. 7 is a block diagram showing the principle of the thirty-second data transfer system.

That is, this aspect is a data transfer system comprising a first communication device (10), a second communication device (20) connected thereto via a first line (A), a third communication device (30) connected thereto via a second line (B), and a fourth communication device (40) connected thereto via a third line (C), wherein if the data transfer direction from the first communication device (10) to the fourth communication device (40) is defined as an up direction and the data transfer direction from the fourth communication device (40) to the first communication device (10) is defined as a down direction, the second communication device (20) has a definite determination information output section (6) for receiving from an externally installed management system "the same information as output by the busy condition occurrence determination section (3) and which is determined definitely by the external management system" and outputting it to the data transmission condition determination section (4) (corresponding to claim 32).

According to the thirty-second data transfer system, the definite determination information output section (6) of the second communication device (20) can receive from the externally installed management system "the same information as output by the busy condition occurrence determination section (3)" and which is determined definitely by the external management system and output it to the data transmission condition determination section (4).

<Thirty-third data transfer system of this invention>

Figure 8:
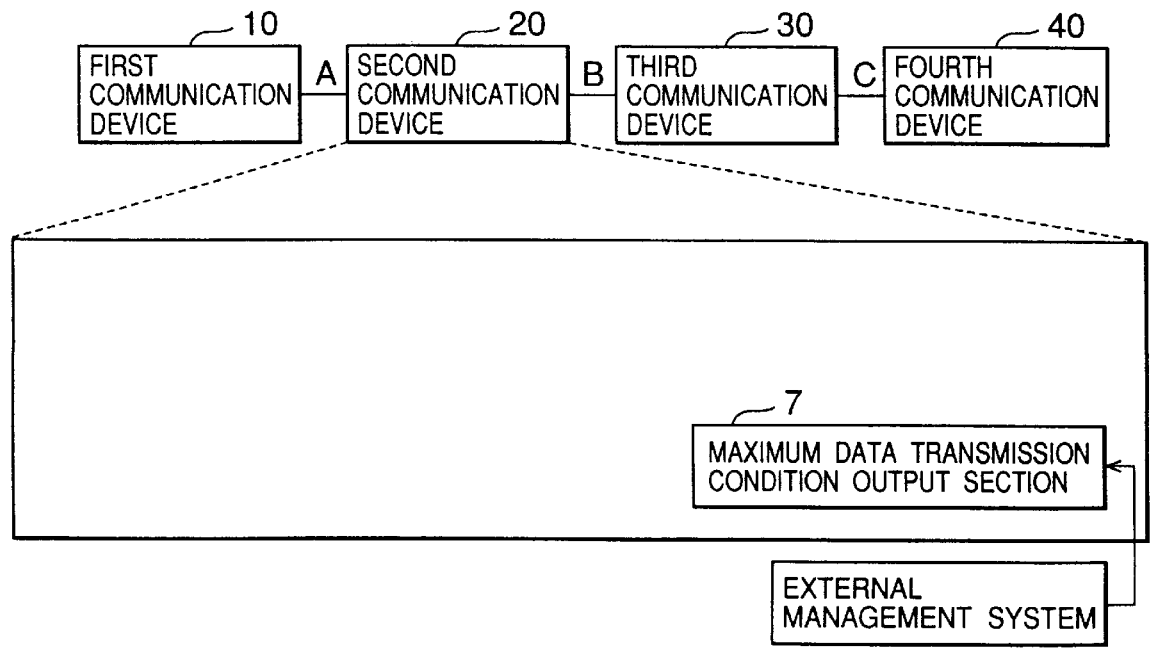
FIG. 8 is a block diagram showing the principle of a thirty-third data transfer system.

A thirty-third data transfer system of this invention has the following configuration to solve the above first and second problems. FIG. 8 is a block diagram showing the principle of the thirty-third data transfer system.

That is, in the eighth data transfer system, the second communication device (20) has a maximum data transmission condition output section (7) for "receiving from an externally installed management system a maximum data transmission condition ($_u d_{Bm}$, $_u t_{Bm}$) for the up channel of the second line (B)" instead of the maximum data transmission condition already stored in the communication device or the busy condition occurrence determination section (3) and "outputting it to the busy condition occurrence determination section (3)" (corresponding to claim 33).

According to the thirty-third data transfer system, the maximum data transmission condition output section (7) of the second communication device (20) can receive from the externally installed management system the maximum data transmission condition ($_u d_{Bm}$, $_u t_{Bm}$) for the up channel of the second line (B) and output it to the busy condition occurrence determination section (3). That is, this section can use this condition instead of the maximum data transmission condition stored in the communication device or the busy condition occurrence determination section (3).

<Thirty-fourth data transfer system according to this invention>

Figure 9:
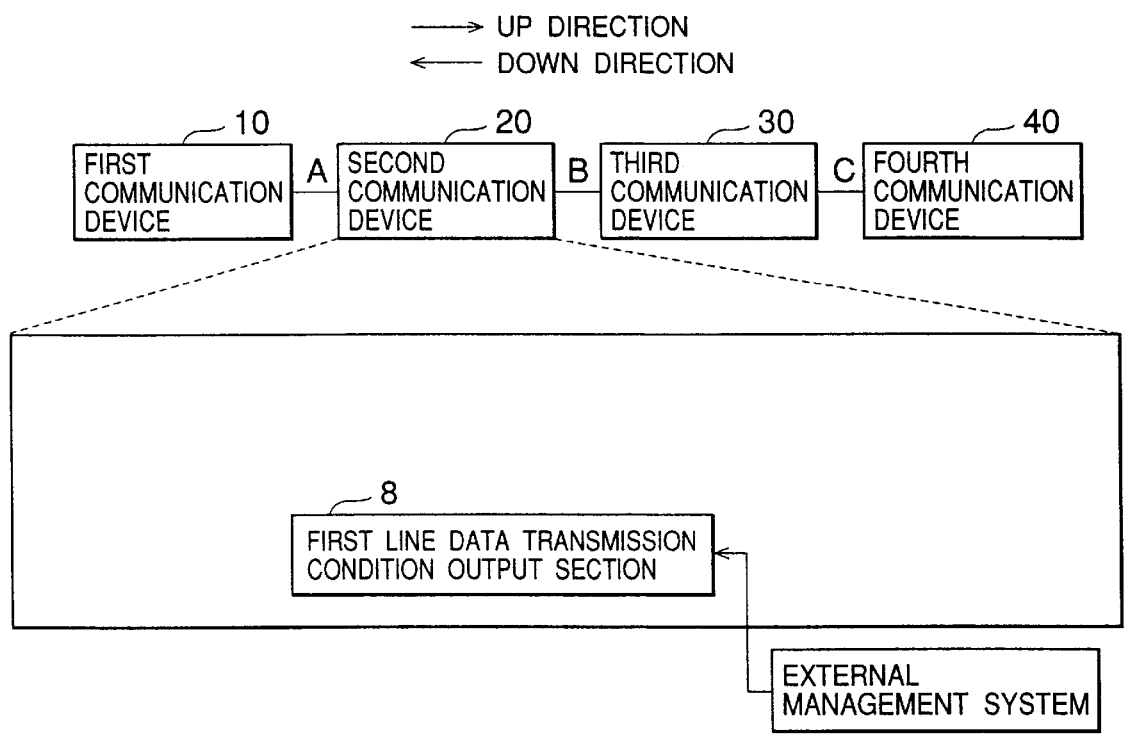
FIG. 9 is a block diagram showing the principle of a thirty-fourth data transfer system.

A thirty-fourth data transfer system according to this invention has the following configuration to solve the first and the second problems. FIG. 9 is a block diagram showing the principle of the thirty-fourth data transfer system.

That is, in the tenth data transfer system, the second communication device (20) has instead of the data transmission condition determination section (4) a first line data transmission condition determination section (8) for receiving from an externally installed management system "a data transmission condition ($_u d_A$, $_u t_A$) value for the up channel of an arbitrary first line (A) based on the specified allocation criteria used in any of the twelfth to twenty-seventh data transfer systems" and transmitting it to the data transmission condition transmission section (1) (corresponding to claim 34).

According to the thirty-fourth data transfer system of this invention, the first line data transmission condition determination section (8) of the second communication device (20) can receive from the externally installed management system "the data transmission condition ($_u d_A$, $_u t_A$) value for the up channel of an arbitrary first line (A) based on the specified allocation criteria used in any of the twelfth to twenty-seventh data transfer systems" and transmit it to the data transmission condition transmission section (1).

<Thirty-fifth data transfer system according to this invention>

Figure 10:
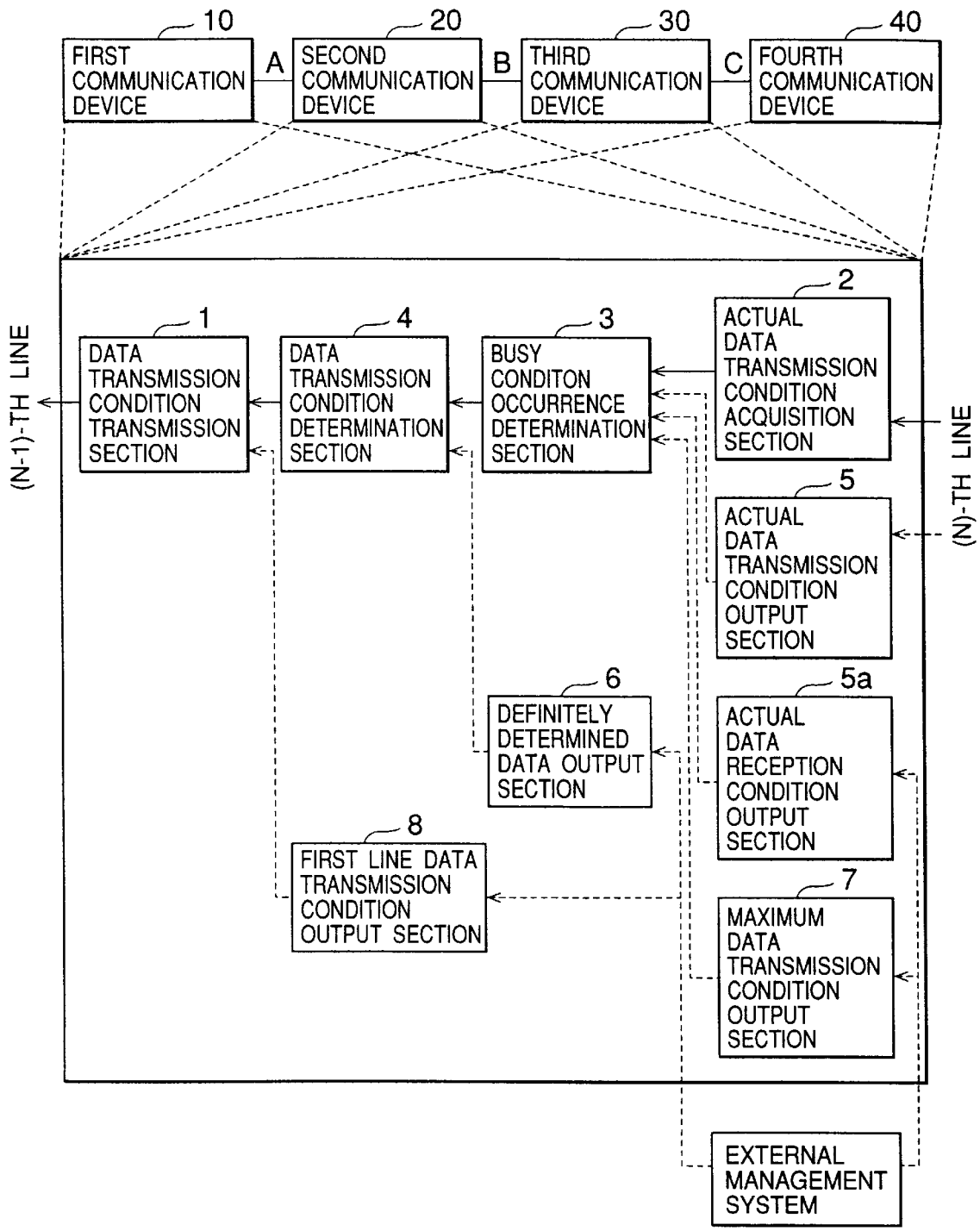
FIG. 10 is a block diagram showing the principle of a thirty-fifth data transfer system.

A thirty-fifth data transfer system according to this invention has the following configuration to solve the first and the second problems. FIG. 10 is a block diagram showing the principle of the thirty-fourth data transfer system.

That is, the functions of the data transmission condition transmission section (1), the actual data transmission condition acquisition section (2), the busy condition occurrence determination section (3), the data transmission condition determination section (4), the actual data transmission condition output section (5), the actual data reception condition output section (5a), the determined information output section (6), the maximum data transmission condition output section (7), and the first line data transmission condition determination section (8) are applicable to the down channel of the first line (A), the up and down lines of the second and the third lines (B) and (C) (corresponding to claim 35).

According to the thirty-fifth data transfer system of this invention, the functions of the data transmission condition transmission section (1), the actual data transmission condition acquisition section (2), the busy condition occurrence determination section (3), the data transmission condition determination section (4), the actual data transmission condition output section (5), the actual data reception condition output section (5a), the determined information output section (6), the maximum data transmission condition output section (7), and the first line data transmission condition determination section (8) are applicable to the down channel of the first line (A), the up and down lines of the second and the third lines (B) and (C).

<Thirty-sixth data transfer system according to this invention>

Figure 11:
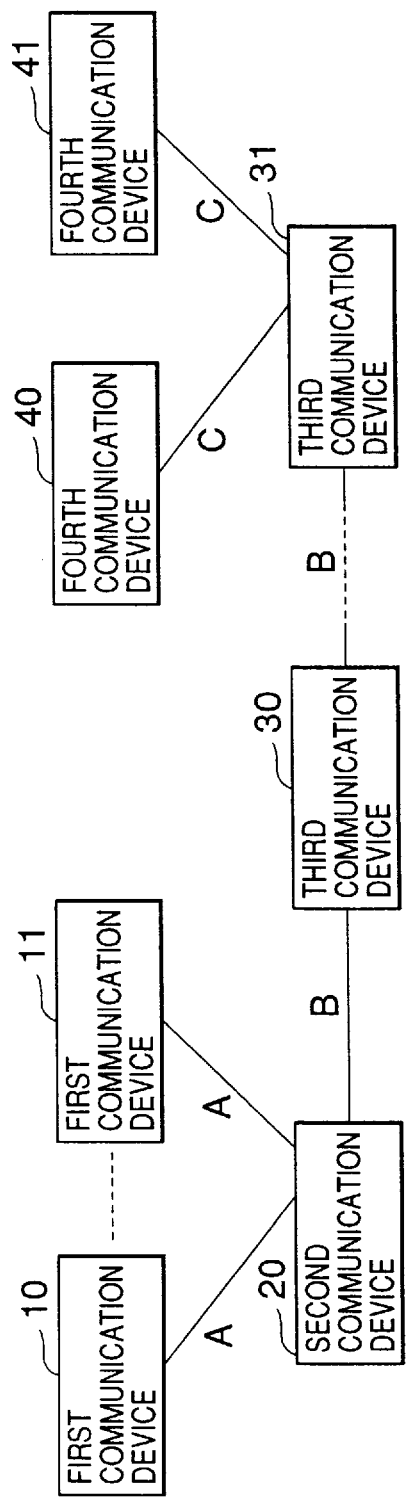
FIG. 11 is a block diagram showing the principle of a thirty-sixth data transfer system.

A thirty-sixth data transfer system according to this invention has the following configuration to solve the first and the second problems. FIG. 11 is a block diagram showing the principle of the thirty-sixth data transfer system.

That is, in the thirty-fifth data transfer system, for better communications, the second communication device (20) connects to a plurality of communication devices (11) that provide a function similar to that of the first communication device (10), the third communication device (30) connects to a plurality of communication devices (41) that provide a function similar to that of the fourth communication device (40), and this is applicable to both up and down channels of each line.

Figure 31:
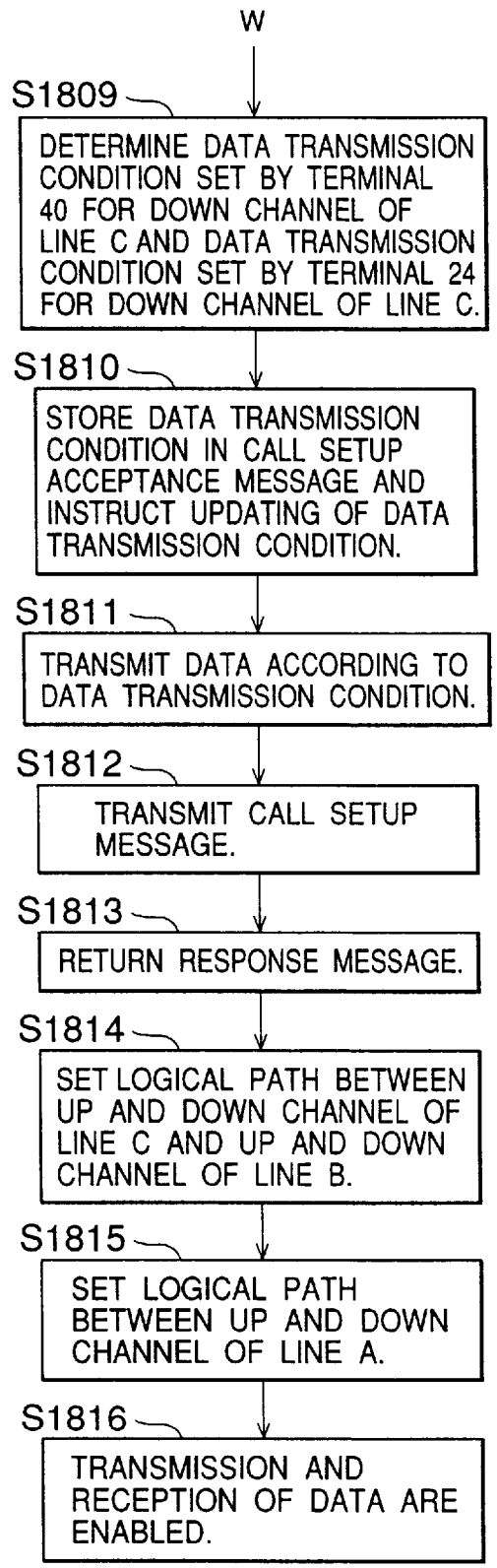
FIG. 31 is a flowchart (2) showing the processing of a "data transmission condition" with the communication between terminals 11 and 41 added in embodiment 1.

According to the thirty-sixth data transfer system of this invention, in the thirty-fifth data transfer system, for better communications, the second communication device (20) connects to a plurality of communication devices (11) that provide a function similar to that of the first communication device (10), the third communication device (30) connects to a plurality of communication devices (41) that provide a function similar to that of the fourth communication device (40), and this is applicable to both up and down channels of each line, as shown in FIG. 31.

<Thirty-seventh data transfer system according to this invention>

A thirty-seventh data transfer system according to this invention has the following configuration to solve the first and the second problems.

That is, in the thirty-fifth data transfer system, if the second communication device (20) and the third communication device (30) uses a fixed virtual logical path instead of a call connection processing to set up and down channels in advance between the first communication device (10) and the fourth communication device (40), the functions of the data transmission condition transmission section (1), the actual data transmission condition acquisition section (2), the busy condition occurrence determination section (3), the data transmission condition determination section (4), the actual data transmission condition output section (5), the actual data reception condition output section (5a), the determined information output section (6), the maximum data transmission condition output section (7), and the first line data transmission condition determination section (8) are applicable to the up and down lines of the first, the second, and the third lines (A), (B), and (C) (corresponding to claim 37).

According to the thirty-seventh data transfer system of this invention, if the second communication device (20) and the third communication device (30) uses a fixed virtual logical path instead of a call connection processing to set up and down channels in advance between the first communication device (10) and the fourth communication device (40), the functions of the data transmission condition transmission section (1), the actual data transmission condition acquisition section (2), the busy condition occurrence determination section (3), the data transmission condition determination section (4), the actual data transmission condition output section (5), the actual data reception condition output section (5a), the determined information output section (6), the maximum data transmission condition output section (7), and the first line data transmission condition determination section (8) are applicable to the up and down lines of the first, the second, and the third lines (A), (B), and (C) (corresponding to claim 37).

<Thirty-eighth data transfer system according to this invention>

A thirty-eighth data transfer system according to this invention has the following configuration to solve the first and the second problems.

That is, in the first to thirty-seventh data transfer systems, if the use of the up and down channels of the first, the second, or the third lines (A), (B), and (C) is charged, the charge is based on the data transmission condition (d, t) value (corresponding to claim 38).

According to the thirty-eighth data transfer system of this invention, in the first to thirty-seventh data transfer systems, if the use of the up and down channels of the first, the second, or the third lines (A), (B), and (C) is charged, the charge can be based on the data transmission condition (d, t) value.

<First data transfer method according to this invention>

Figure 12:
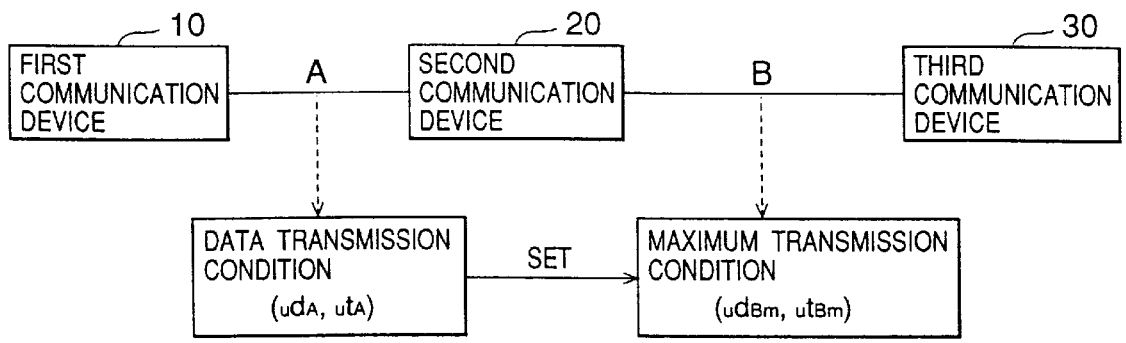
FIG. 12 is a flowchart showing the principle of a first data transfer method.
Figure 20:
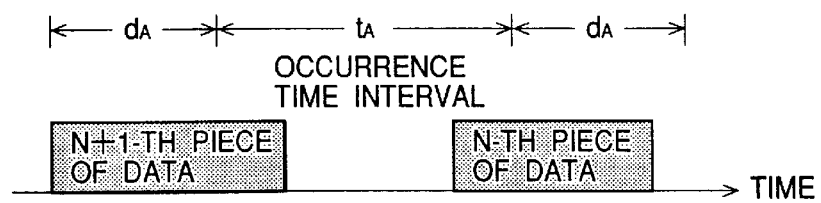
FIG. 20 shows data transfer on a line in the first to the ninth data transfer method.

A first data transfer method according to this invention has the following configuration to solve the first and the second problems. FIG. 12 is a flowchart showing the principle of the first data transfer method, and FIG. 20 shows data transfer on a line.

That is, this invention is a data transfer method comprising a first communication device (10), a second communication device (20) connected thereto via a first line (A), a third communication device (30) connected thereto via a second line (B), wherein if the transmission time from the leading bit of continuous data to its trailing bit (referred to as "continuous data" below) is defined as data length time $d_A$ and the occurrence time interval of continuous data is referred to as $t_A$ when the continuous data is transmitted from the first communication device (10) to the second communication device (20) via the first line (A), and if the transmission time from the leading bit of continuous data to its trailing bit (referred to as "continuous data" below) is defined as data length time $d_B$ and the occurrence time interval of continuous data is referred to as $t_B$ when the continuous data is transmitted from the second communication device (20) to the third communication device (30) via the second line (B), the data transmission condition ($_ud_A$, $_ut_A$) for the first line (A) is set to the maximum data transmission condition ($_ud_{Bm}$, $_ut_{Bm}$) for the second line (B) (corresponding to claim 39).

According to the first data transfer method of this invention, the data transmission condition ($_ud_A$, $_ut_A$) for the first line (A) can be set to the maximum data transmission condition ($_ud_{Bm}$, $_ut_{Bm}$) for the second line (B), thereby preventing a busy condition from occurring in the second communication device (20) and maximizing the data transfer efficiency of the up channel of the second line (B).

The same effect can be produced on the down channel by using a means that inverses the relationship between the first communication device (10) and the second communication device (20).

<Second data transfer method according to this invention>

Figure 13:
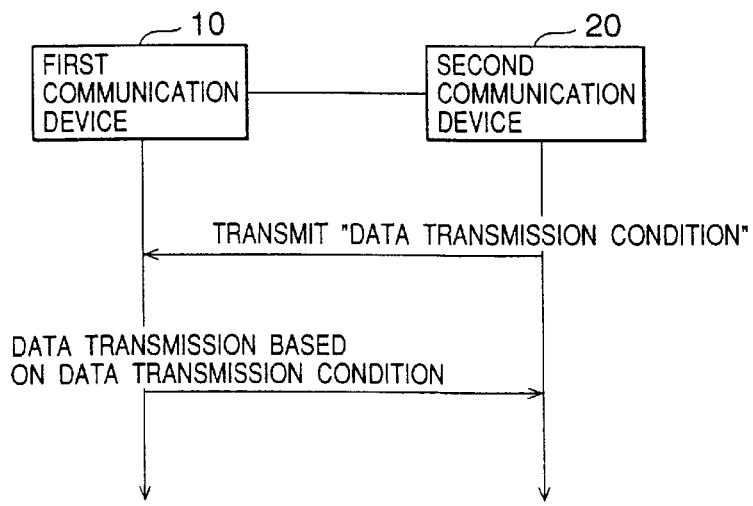
FIG. 13 is a flowchart showing the principle of a second data transfer method.

A second data transfer method according to this invention has the following configuration to solve the first and the second problems. FIG. 13 is a flowchart showing the principle of the second data transfer method, and FIG. 20 shows data transfer on a line.

That is, this invention is a data transfer method comprising a first communication device (10) and a second communication device (20) connected thereto via a first line (A), wherein the second communication device (20) transmits a data transmission condition (d, t) to the first communication device (10), and wherein the first communication device (10) transmits data based on the data transmission condition (d, t) (corresponding to claim 40).

According to the second data transfer method according to this invention, the second communication device (20) can transmit the data transmission condition (d, t) to the first communication device (10), and the first communication device (10) can transmit data based on the data transmission condition (d, t).

That is, the receiver and the transmitter can control the amount of transmitted data according to the value of a specified amount.

<Third data transfer method according to this invention>

A third data transfer method according to this invention has the following configuration to solve the first and the second problems.

That is, the data transfer method in the second data transfer method is used as required (corresponding to claim 41).

According to the third data transfer method according to this invention, the second data transfer method is used as required.

That is, this method can be switched to other data transfer methods.

<Fourth data transfer method according to this invention>

Figure 14:
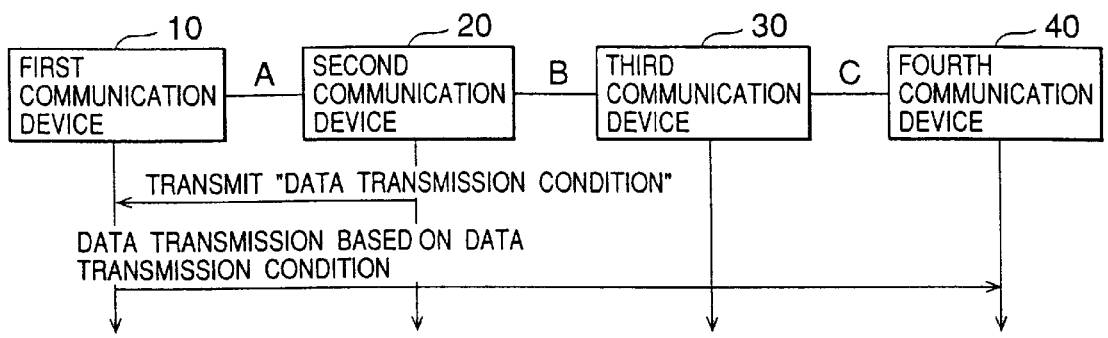
FIG. 14 is a flowchart showing the principle of a fourth data transfer method.

A fourth data transfer method according to this invention has the following configuration to solve the second problem. FIG. 14 is a flowchart showing the principle of the fourth data transfer method, and FIG. 20 shows data transfer on a line.

That is, this invention is a data transfer method comprising a first communication device (10), a second communication device (20) connected thereto via a first line (A), a third communication device (30) connected thereto via a second line (B), and a fourth communication device (40) connected thereto via a third line (C), the first communication device (10) transferring data to the fourth communication device (40) via the second and the third communication devices (20) and (30), wherein if a busy condition occurs in the second communication device (20) during communications between the first communication device (10) and the fourth communication device (40), the second communication device (20) transmits to the first communication device (10) a data transmission condition ($d_A$, $t_A$) for the first line (A) which is set by any of the first to the thirty-fourth data transfer systems, and the first communication device (10) transmits data based on the data transmission condition ($d_A$, $t_A$) (corresponding to claim 42).

According to the fourth data transfer method according to this invention, if a busy condition occurs in the second communication device (20) during communications between the first communication device (10) and the fourth communication device (40), the second communication device (20) can transmit to the first communication device (10) the data transmission condition ($d_A$, $t_A$) for the first line (A) which is set by any of the first to the thirty-fourth data transfer systems.

The first communication device (10) transmits data based on the data transmission condition ($d_A$, $t_A$), thereby clearing the busy condition.

<Fifth data transfer method according to this invention>

Figure 15:
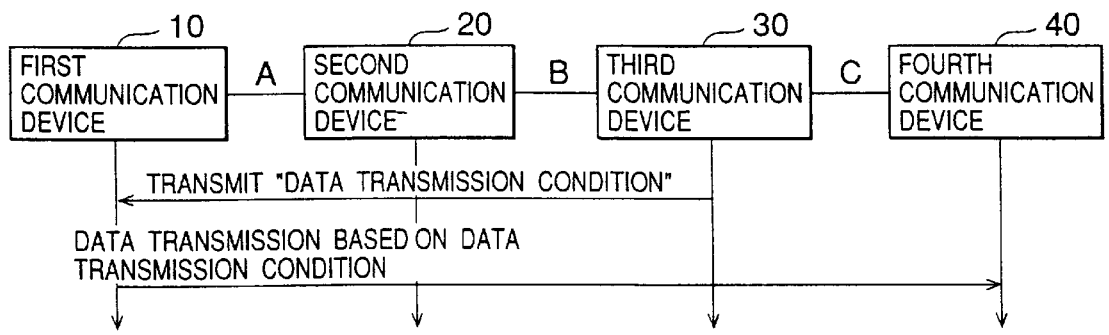
FIG. 15 is a flowchart showing the principle of a fifth data transfer method.

A fifth data transfer method according to this invention has the following configuration to solve the second problem. FIG. 15 is a flowchart showing the principle of the fifth data transfer method, and FIG. 20 shows data transfer on a line.

That is, this invention is a data transfer method comprising a first communication device (10), a second communication device (20) connected thereto via a first line (A), a third communication device (30) connected thereto via a second line (B), and a fourth communication device (40) connected thereto via a third line (C), the first communication device (10) transferring data to the fourth communication device (40) via the second and the third communication devices (20) and (30), wherein if a busy condition occurs in the third communication device (30) during communications between the first communication device (10) and the fourth communication device (40), the third communication device (30) transmits to the first communication device (10) a data transmission condition (dA, tA) for the first line (A) which is set by any of the first to the thirty-fourth data transfer systems, and the first communication device (10) transmits data based on the data transmission condition ($d_A$, $t_A$) (corresponding to claim 43).

According to the fifth data transfer method according to this invention, if a busy condition occurs in the third communication device (30) during communications between the first communication device (10) and the fourth communication device (40), the third communication device (30) can transmit to the first communication device (10) the data transmission condition ($d_A$, $t_A$) for the first line (A) which is set by any of the first to the thirty-fourth data transfer systems.

The first communication device (10) transmits data based on the data transmission condition ($d_A$, $t_A$) thereby clearing the busy condition.

<Sixth data transfer method according to this invention>

Figure 16:
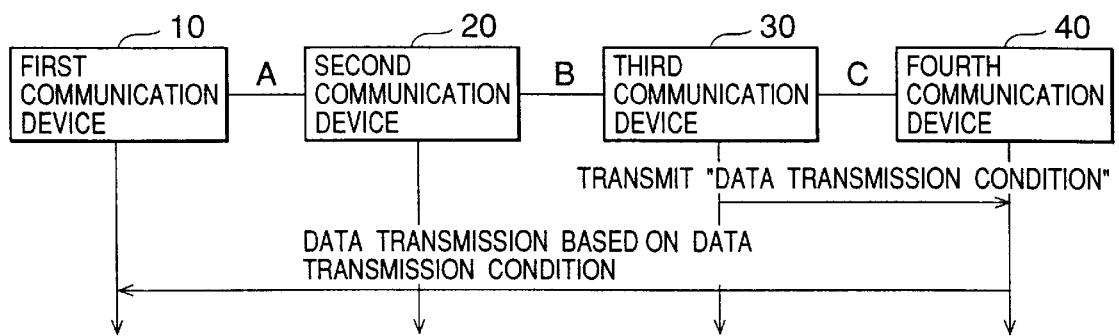
FIG. 16 is a flowchart showing the principle of a sixth data transfer method.

A sixth data transfer method according to this invention has the following configuration to solve the second problem. FIG. 16 is a flowchart showing the principle of the sixth data transfer method, and FIG. 20 shows data transfer on a line.

That is, this invention is a data transfer method comprising a first communication device (10), a second communication device (20) connected thereto via a first line (A), a third communication device (30) connected thereto via a second line (B), and a fourth communication device (40) connected thereto via a third line (C), the first communication device (10) transferring data to the fourth communication device (40) via the second and the third communication devices (20) and (30), wherein if a busy condition occurs in the third communication device (30) during communications between the first communication device (10) and the fourth communication device (40), the third communication device (30) transmits to the fourth communication device (10) a data transmission condition ($d_C$, $t_C$) for the third line (C), and the fourth communication device (40) transmits data based on the data transmission condition ($d_C$, $t_C$) which is set by any of the first to the thirty-fourth data transfer systems (corresponding to claim 44).

According to the sixth data transfer method according to this invention, if a busy condition occurs in the third communication device (30) during communications between the first communication device (10) and the fourth communication device (40), the third communication device (30) can transmit to the fourth communication device (40) the data transmission condition ($d_C$, $t_C$) for the third line (C) which is set by any of the first to the thirty-fourth data transfer systems.

The fourth communication device (40) transmits data based on the data transmission condition ($d_C$, $t_C$), thereby clearing the busy condition.

<Seventh data transfer method according to this invention>

Figure 17:
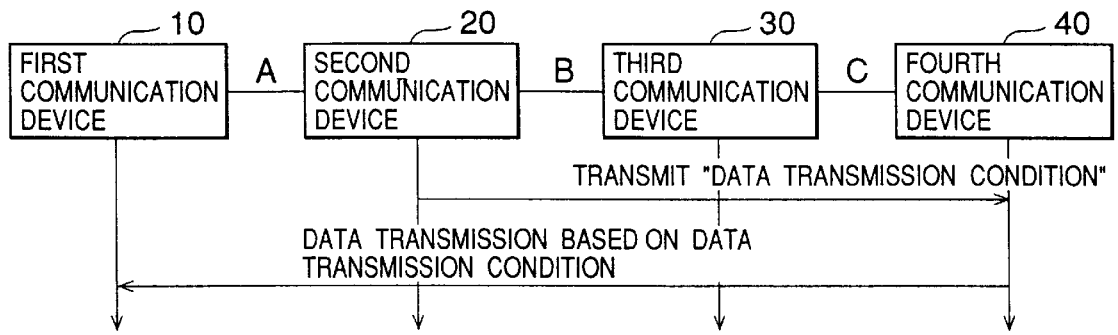
FIG. 17 is a flowchart showing the principle of a seventh data transfer method.

A seventh data transfer method according to this invention has the following configuration to solve the second problem. FIG. 17 is a flowchart showing the principle of the seventh data transfer method, and FIG. 20 shows data transfer on a line.

That is, this invention is a data transfer method comprising a first communication device (10), a second communication device (20) connected thereto via a first line (A), a third communication device (30) connected thereto via a second line (B), and a fourth communication device (40) connected thereto via a third line (C), the first communication device (10) transferring data to the fourth communication device (40) via the second and the third communication devices (20) and (30), wherein if a busy condition occurs in the second communication device (20) during communications between the first communication device (10) and the fourth communication device (40), the second communication device (20) transmits to the fourth communication device (10) a data transmission condition (dC, tC) for the third line (C) which is set by any of the first to the thirty-fourth data transfer systems, and the fourth communication device (40) transmits data based on the data transmission condition ($d_C$, $t_C$) (corresponding to claim 45).

According to the seventh data transfer method according to this invention, if a busy condition occurs in the second communication device (20) during communications between the first communication device (10) and the fourth communication device (40), the second communication device (20) can transmit to the fourth communication device (40) the data transmission condition ($d_C$, $t_C$) for the third line (C) which is set by any of the first to the thirty-fourth data transfer systems.

The fourth communication device (40) transmits data based on the data transmission condition ($d_C$, $t_C$), thereby clearing the busy condition.

<Eighth data transfer method according to this invention>

Figure 18:
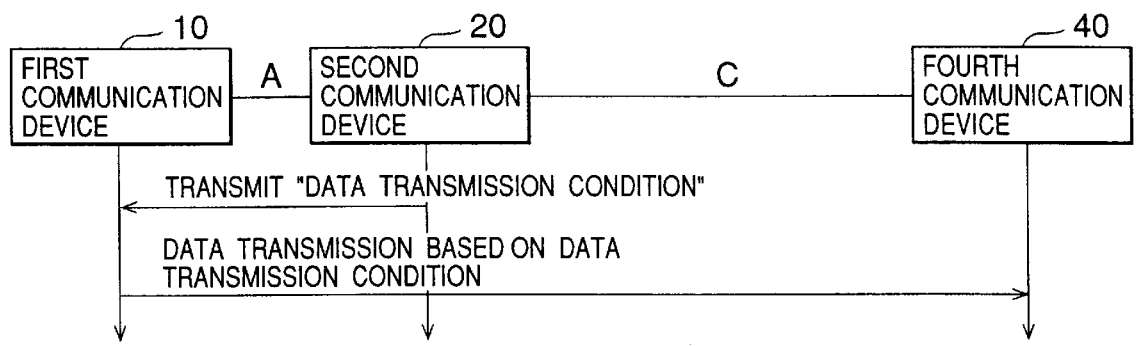
FIG. 18 is a flowchart showing the principle of an eighth data transfer method.

An eighth data transfer method according to this invention has the following configuration to solve the second problem. FIG. 18 is a flowchart showing the principle of the eighth data transfer method, and FIG. 20 shows data transfer on a line.

That is, this invention is a data transfer method comprising a first communication device (10), a second communication device (20) connected thereto via a first line (A), a third communication device (30) connected thereto via a second line (B), and a fourth communication device (40) connected thereto via a third line (C), the first communication device (10) transferring data to the fourth communication device (40) via the second and the third communication devices (20) and (30), wherein if a busy condition occurs in the second communication device (20) during communications between the first communication device (10) and the fourth communication device (40), the second communication device (20) transmits to the first communication device (10) a data transmission condition ($d_A$, $t_A$) for the first line (A) which is set by any of the first to the thirty-fourth data transfer systems, and p1 the first communication device (10) transmits data based on the data transmission condition ($d_A$, $t_A$) (corresponding to claim 46).

According to the eighth data transfer method according to this invention, if a busy condition occurs in the second communication device (20) during communications between the first communication device (10) and the fourth communication device (40), the second communication device (20) can transmit to the first communication device (10) the data transmission condition ($d_A$, $t_A$) for the first line (A) which is set by any of the first to the thirty-fourth data transfer systems.

The first communication device (10) transmits data based on the data transmission condition ($d_A$, $t_A$), thereby clearing the busy condition.

<Ninth data transfer method according to this invention>

Figure 19:
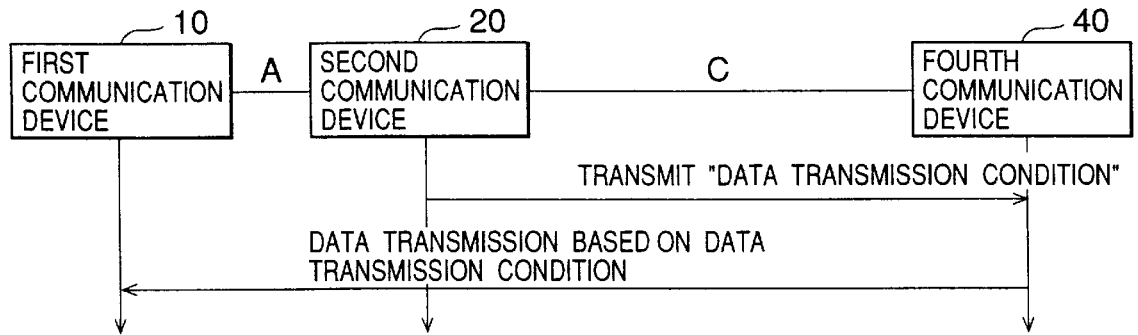
FIG. 19 is a flowchart showing the principle of a ninth data transfer method.

A ninth data transfer method according to this invention has the following configuration to solve the second problem. FIG. 19 is a flowchart showing the principle of the ninth data transfer method, and FIG. 20 shows data transfer on a line.

That is, this invention is a data transfer method comprising a first communication device (10), a second communication device (20) connected thereto via a first line (A), and a fourth communication device (40) connected thereto via a third line (C), the first communication device (10) transferring data to the fourth communication device (40) via the second communication devices (20) and (30), wherein if a busy condition occurs in the second communication device (20) during communications between the first communication device (10) and the fourth communication device (40), the second communication device (20) transmits to the fourth communication device (10) a data transmission condition (dC, tC) for the third line (C) which is set by any of the first to the thirty-fourth data transfer systems, and the fourth communication device (40) transmits data based on the data transmission condition ($d_c$, $t_c$) (corresponding to claim 47).

According to the ninth data transfer method according to this invention, if a busy condition occurs in the second communication device (20) during communications between the first communication device (10) and the fourth communication device (40), the second communication device (20) can transmit to the fourth communication device (40) the data transmission condition ($d_C$, $t_C$) for the third line (C) which is set by any of the first to the thirty-fourth data transfer systems.

The fourth communication device (40) transmits data based on the data transmission condition ($d_C$, $t_C$), thereby clearing the busy condition.

<Tenth data transfer method according to this invention>

A tenth data transfer method according to this invention has the following configuration to solve the first problem.

That is, in the fourth data transfer method, even if a busy condition is not occurring in the second communication device (20), the second communication device (20) transmits to the first communication device (10) the data transmission condition ($d_A$, $t_A$) set by any of the first to the thirty fourth data transfer systems (corresponding to claim 48).

According to the tenth data transfer method, even if a busy condition is not occurring in the second communication device (20), the second communication device (20) can transmit to the first communication device (10) the data transmission condition ($d_A$, $t_A$) set by any of the first to the thirty fourth data transfer systems, preventing a busy condition from occurring and still enabling lines to be used efficiently.

<Eleventh data transfer method according to this invention>

An eleventh data transfer method according to this invention has the following configuration to solve the first problem.

That is, in the fifth data transfer method, even if a busy condition is not occurring in the third communication device (30), the third communication device (30) transmits to the first communication device (10) the data transmission condition ($d_A$, $t_A$) set by any of the first to the thirty fourth data transfer systems (corresponding to claim 49).

According to the eleventh data transfer method, even if a busy condition is not occurring in the third communication device (30), the third communication device (30) can transmit to the first communication device (10) the data transmission condition ($d_A$, $t_A$) set by any of the first to the thirty fourth data transfer systems, preventing a busy condition from occurring and still enabling lines to be used efficiently.

<Twelfth data transfer method according to this invention>

A twelfth data transfer method according to this invention has the following configuration to solve the first problem.

That is, in the sixth data transfer method, even if a busy condition is not occurring in the third communication device (30), the third communication device (30) transmits to the fourth communication device (40) the data transmission condition ($d_C$, $t_C$) set by any of the first to the thirty fourth data transfer systems (corresponding to claim 50).

According to the twelfth data transfer method, even if a busy condition is not occurring in the third communication device (30), the third communication device (30) can transmit to the fourth communication device (40) the data transmission condition ($d_C$, $t_C$) set by any of the first to the thirty fourth data transfer systems, preventing a busy condition from occurring and still enabling lines to be used efficiently.

<Thirteenth data transfer method according to this invention>

A thirteenth data transfer method according to this invention has the following configuration to solve the first problem.

That is, in the seventh data transfer method, even if a busy condition is not occurring in the second communication device (20), the second communication device (20) transmits to the fourth communication device (40) the data transmission condition ($d_C$, $t_C$) set by any of the first to the thirty fourth data transfer systems (corresponding to claim 51).

According to the thirteenth data transfer method, even if a busy condition is not occurring in the second communication device (20), the second communication device (20) can transmit to the fourth communication device (40) the data transmission condition ($d_C$, $t_C$) set by any of the first to the thirty fourth data transfer systems, preventing a busy condition from occurring and still enabling lines to be used efficiently.

<Fourteenth data transfer method according to this invention>

A fourteenth data transfer method according to this invention has the following configuration to solve the first problem.

That is, in the eighth data transfer method, even if a busy condition is not occurring in the second communication device (20), the second communication device (20) transmits to the first communication device (10) the data transmission condition ($d_A$, $t_A$) set by any of the first to the thirty fourth data transfer systems (corresponding to claim 52).

According to the fourteenth data transfer method, even if a busy condition is not occurring in the second communication device (20), the second communication device (20) can transmit to the first communication device (10) the data transmission condition ($d_A$, $t_A$) set by any of the first to the thirty fourth data transfer systems, preventing a busy condition from occurring and still enabling lines to be used efficiently.

<Fifteenth data transfer method according to this invention>

A fifteenth data transfer method according to this invention has the following configuration to solve the first problem.

That is, in the ninth data transfer method, even if a busy condition is not occurring in the second communication device (20), the second communication device (20) transmits to the fourth communication device (40) the data transmission condition ($d_C$, $t_C$) set by any of the first to the thirty fourth data transfer systems (corresponding to claim 53).

According to the fifteenth data transfer method, even if a busy condition is not occurring in the second communication device (20), the second communication device (20) can transmit to the fourth communication device (40) the data transmission condition ($d_C$, $t_C$) set by any of the first to the thirty fourth data transfer systems, preventing a busy condition from occurring and enabling lines to be used efficiently.

<Sixteenth data transfer method according to this invention>

A sixteenth data transfer method according to this invention has the following configuration to solve the first and the second problem.

That is, this invention is a data transfer method comprising a first communication device (10), a second communication device (20) connected thereto via a first line (A), a fifth communication device (50) connected thereto via a first trunk line ($B_1$), a third communication device (30) connected thereto via a second trunk line ($B_2$), and a fourth communication device (40) connected thereto via a third line (C) with data transferred bilaterally between the first communication device (10) and the second communication device (20), between the second communication device (20) and the fifth communication device (50), between the fifth communication device (50) and the third communication device (30), and between the third communication device (30) and the fourth communication device (40), wherein if the direction in which data is transferred from the first communication device (10) to the fourth communication device (40) is defined as an up direction and the direction in which data is transferred from the fourth communication device (40) to the first communication device (10) is defined as a down direction, the fifth communication device (50)

transmits to the second communication device (20) a data transmission condition ($_u d_{B2}$, $_u t_{B2}$) for the up channel of the second trunk line ($B_2$) which is set by any of the first to the thirty-fourth data transfer systems, transmits to the first communication device (10) a data transmission condition ($_u d_{B1}$, $_u t_{B1}$) for the up channel of the first trunk line ($B_1$) which is set by any of the first to the thirty-fourth data transfer systems, transmits to the third communication device (30) a data transmission condition ($_d d_{B1}$, $_d t_{B1}$) for the down channel of the first trunk line ($B_1$) which is set by any of the first to the thirty-fourth data transfer systems, and transmits to the fourth communication device (40) a data transmission condition ($_d d_{B2}$, $_d t_{B2}$) for the down channel of the second trunk line ($B_2$) which is set by any of the first to the thirty-fourth data transfer systems (corresponding to claim 54).

According to the sixteenth data transfer method according to this invention, the fifth communication device (50) can transmit to the second communication device (20) a data transmission condition ($_u d_{B2}$, $_u t_{B2}$) for the up channel of the second trunk line ($B_2$) which is set by any of the first to the thirty-fourth data transfer systems.

The fifth communication device can also transmit to the first communication device (10) a data transmission condition ($_u d_{B1}$, $_u t_{B1}$) for the up channel of the first trunk line ($B_1$) which is set by any of the first to the thirty-fourth data transfer systems.

The fifth communication device can also transmit to the third communication device (30) a data transmission condition ($_d d_{B1}$, $_d t_{B1}$) for the down channel of the first trunk line ($B_1$) which is set by any of the first to the thirty-fourth data transfer systems, and Furthermore, the fifth communication device can transmit to the fourth communication device (40) a data transmission condition ($_d d_{B2}$, $_d t_{B2}$) for the down channel of the second trunk line ($B_2$) which is set by any of the first to the thirty-fourth data transfer systems, thereby preventing busy condition from occurring and still enabling lines to be used efficiently.

According to the first to third, and tenth to sixteenth data transfer methods and the first to thirty-eighth data transfer systems, before data transfer, a receiving device can transmit to a transmitting device a "data transmission condition" for quantitatively specifying the amount of transmitted data, thereby providing a data transfer method and system that prevents a busy condition from occurring and still enabling lines to be used efficiently.

According to the fourth to ninth data transfer methods and the first to thirty-eighth data transfer systems, a data transmission condition that is a specific condition for causing a busy condition is transmitted from a transmitting device to a receiving device even if a busy condition actually occurs, thereby enabling the provision of a data transfer method and system capable of quantitatively clearing such a busy condition.

Furthermore, once a network is established using the fourth to ninth data transfer methods and the first to thirty-eighth data transfer systems, the need to provide facilities (for example, alternate lines) for avoiding a busy condition due to an unpredictable abnormal traffic is obviated.

The first to sixteenth data transfer methods and the first to thirty-eighth data transfer systems obviates the need of a "data reception buffer for terminal lines" and a "transmission/reception buffer memory for transit" provided in conventional communication devices. This minimizes the need of a buffer function for storing optical signals used in an optical communication device for transferring data using optical signals, so this invention is in particular expected to contribute substantially to optical communication devices.

[Embodiment]

Embodiments 1 to 4 of this invention are described below with reference to the drawings.

[Embodiment 1]

<Overall configuration of Embodiment 1>

Figure 21:
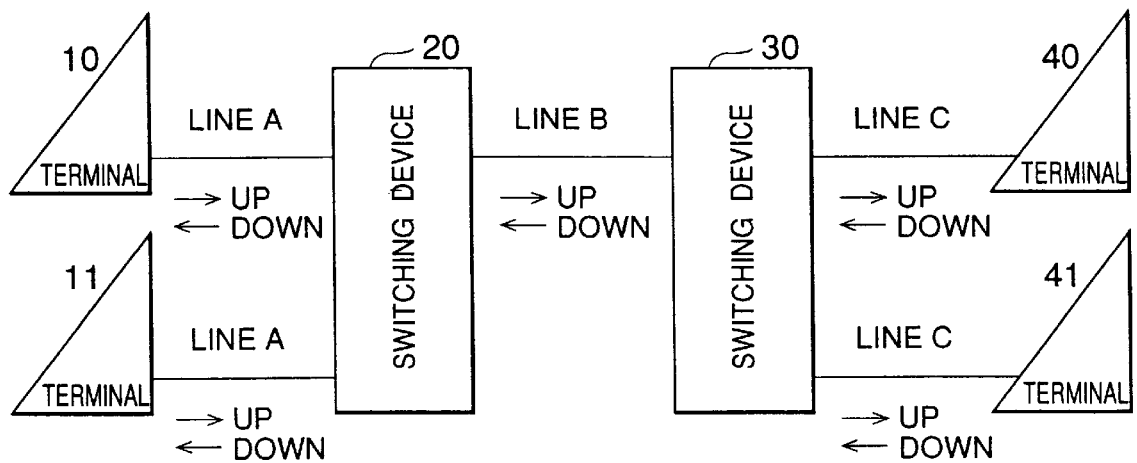
FIG. 21 is a general block diagram of embodiment 1.

First, the overall configuration of Embodiment 1 is described, which is shown in FIG. 21.

A switching device 20 connects a terminal 10 and a terminal 11 via a line A that is a first line. A switching device 30 is connected to the switching device 20 via a trunk line that is a second line (referred to as a "line B" below). The switching device 30 is connected to a terminal 40 via a receiving line C that is a third line (referred to as a "line C" below).

The switching devices 20 and 30 are ATM switching devices that use user information and control information such as messages for call connection processing in units of cell.

Call connections between each terminal and the switching device are processed according to the TTC standard-JT-Q981 (the Layer 3 protocol for user network interfaces).

Call connections between the switching device 20 and the switching device 30 are processed according to the TTC standard-JT-Q931-a (the Layer 3 protocol for inter-PBX connections).

<Internal configuration of Embodiment 1>

Figure 22:
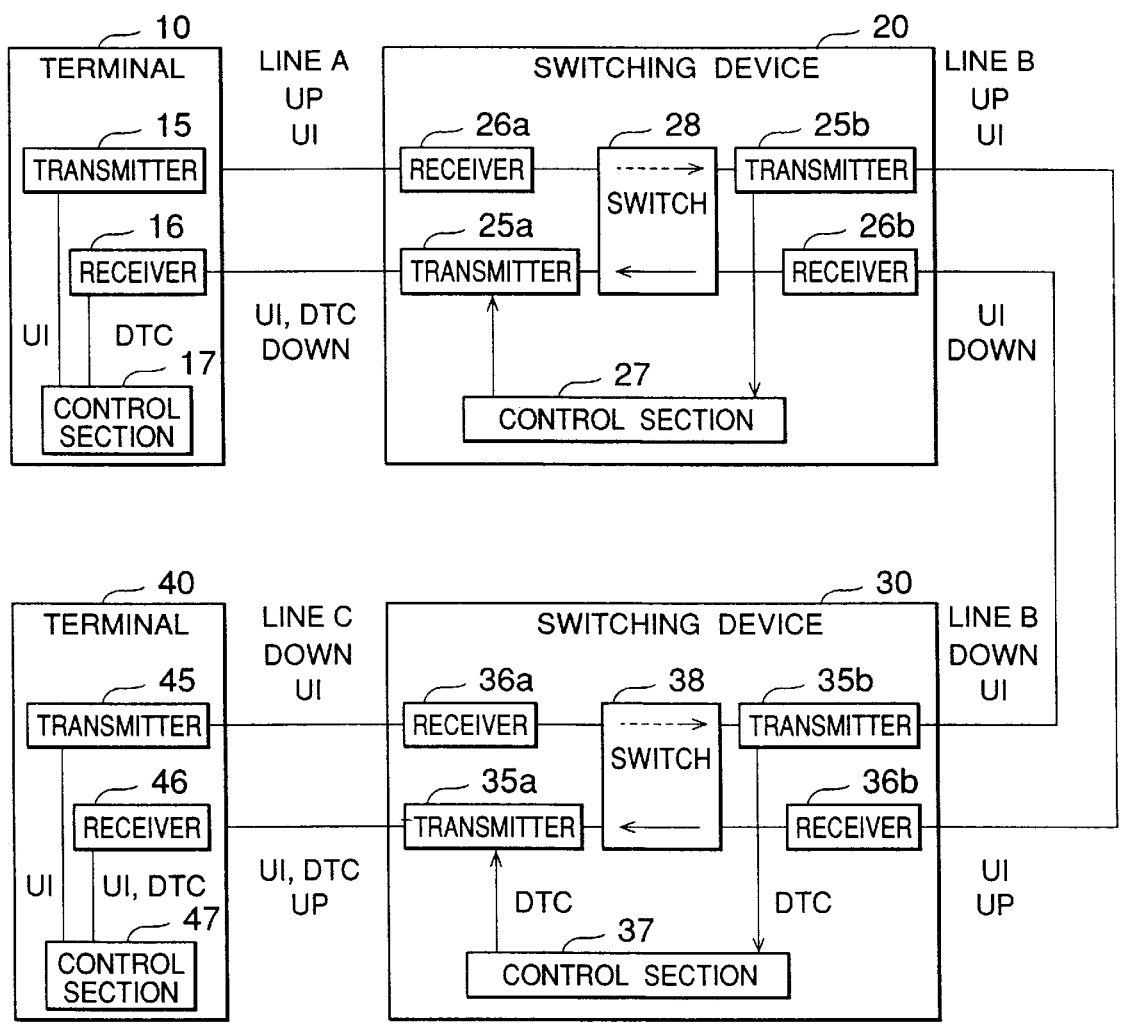
FIG. 22 is a block diagram of the internal configuration of embodiment 1.

Next, the internal configuration of Embodiment 1 is described, which is shown in FIG. 22.

[Terminal 10]

The terminal 10 has a transmitter 15 and a receiver 16 both connected to the line A. In the line A, the direction in which information is communicated from the terminal 10 to the switching device 20 is called an up direction, while the direction in which information is communicated from the switching device 20 to the terminal 10 is called a down direction.

Figure 23:
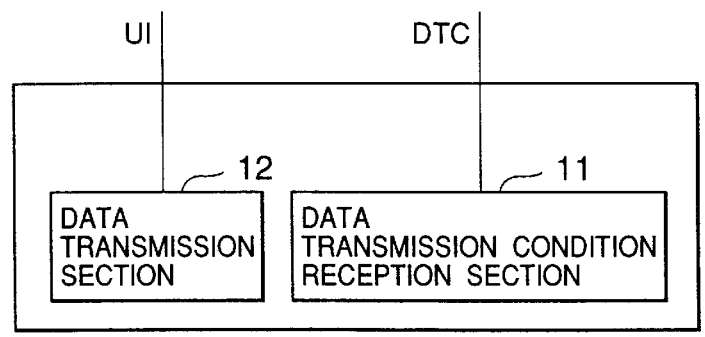
FIG. 23 is a block diagram of a control section for terminals in the embodiment 1.

A control section 17 is connected to both the transmitter 15 and the receiver 16. The control section 17 has a data transmission condition reception section 11 and a data reception section 12 therein, as shown in FIG. 23.

The data transmission condition reception section 11 receives a data transmission condition for the up channel of the line A.

The data transmission section 12 transmits data under the data transmission condition received by the data transmission condition reception section 11 or a lower condition.

[Switching device 20]

The switching device 20 has a transmitter 25a and a receiver 26a both connected to the line A. A switch 28 is connected to both the transmitter 25a and the receiver 26a. The switch 28 is connected to both a transmitter 25b and a receiver 26b. A line B is connected to both the transmitter 25b and the receiver 26b. In the line B, the direction in which information is communicated from the switching device 20 to the switching device 30 is called an up direction, while the direction in which information is communicated from the switching device 30 to the switching device 20 is called a down direction.

Figure 24:
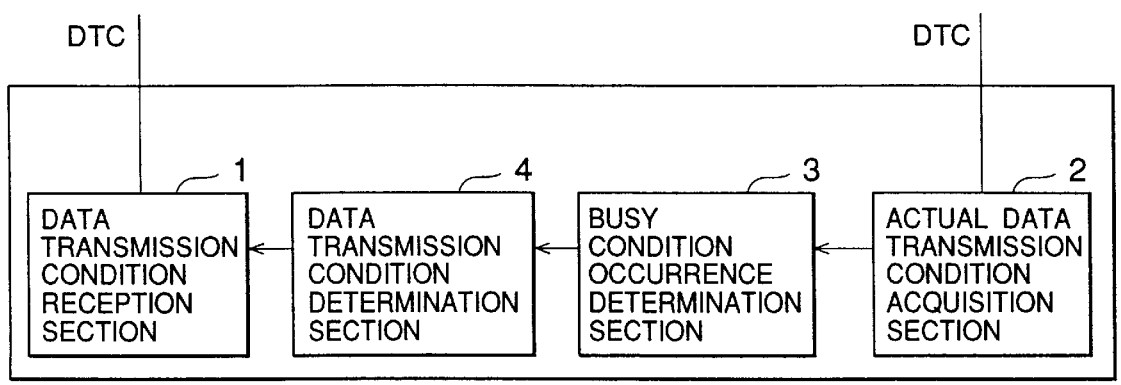
FIG. 24 is a block diagram of a control section for an exchange device and an ATM communication device in the embodiment.

A control section 27 is connected to both the transmitter 25a and the receiver 25b. The control section 27 has an actual data transmission condition acquisition section 2 therein, as shown in FIG. 24. The actual data transmission condition acquisition section 2 is connected to a busy condition occurrence determination section 3. The busy condition occurrence determination section 3 is connected to a data transmission condition determination section 4. The data transmission condition determination section 4 is connected to a data transmission condition transmission section 1.

The actual data transmission condition acquisition section 2 monitors data transmitted on the up channel of the second line B to obtain actual data length time dr and actual data transmission interval time tr as actual data transmission conditions. The actual data transmission condition acquisition section 2 may be substituted by any of the following (i) to (ii).

(i) An actual data transmission condition output section 5 for receiving an actual data transmission condition ($_ud_{Br}$, $_ut_{Br}$) transmitted by the actual data transmission condition transmission section 22 and outputting it to a busy condition occurrence determination section 3.

(ii) An actual data reception condition output section 5a for receiving an actual data reception condition ($_ud_{Br}$, $_ut_{Br}$) for the up channel of the second line B which is monitored and measured by an externally installed management system and outputting it to the busy condition occurrence determination section 3.

(iii) A maximum data transmission condition output section 7 for receiving a maximum data transmission condition ($_ud_{Bm}$, $_ut_{Bm}$) for the up channel from an externally installed management system and outputting it to the busy condition occurrence determination section 3.

The busy condition occurrence determination section 3 determines whether or not a busy condition is occurring on the channel of the line B by comparing the maximum data length time dm and maximum data transmission interval time tm set for the up channel of the line B or obtained as in (iii) to the actual data length time dr and actual data transmission interval time tr obtained by the actual data transmission condition acquisition section 2.

The busy condition occurrence determination section 3 may be replaced by a definitely determined information output section 6 for receiving the "same information as output by the busy condition occurrence determination section 3" which is determined definitely by an externally installed management system and outputting it to a data transmission condition determination section 4.

The data transmission condition determination section 4 determines a data transmission condition for the up channel of the line A based on the results output by the busy condition occurrence determination section 3 using a predetermined allocation criteria in such a way that data can be transferred efficiently on the up line of the line B without causing a busy condition thereon.

The data transmission condition determination section 4 may be substituted by a first line data transmission condition determination section 8 (see FIG. 10) for "receiving a data transmission condition ($_ud_A$, $_ut_A$) for the up channel from an externally installed management system and outputting it to a data transmission condition transmission section 1.

The data transmission condition section 1 transmits the data length time dA and data transmission interval time $t_A$ of transmitted data to the terminal 10 via the transmitter 2 as a data transmission condition for the up channel of the line A.

[Switching device 30]

The switching device 30 has a transmitter 35b and a receiver 36b both connected to the line B. A switch 38 is connected to both the transmitter 35b and the receiver 36b. The switch 38 is connected to both a transmitter 35a and a receiver 36a. A line C is connected to both the transmitter 35a and the receiver 36a.

In the line C, the direction in which information is communicated from the switching device 30 to a terminal 40 is called an up direction, while the direction in which information is communicated from the terminal 40 to the switching device 30 is called a down direction.

A control section 37 is connected to both the transmitter 35a and the receiver 35b. The control section 27 has the actual data transmission condition acquisition section 2 therein, as shown in FIG. 24. The actual data transmission condition acquisition section 2 has the busy condition occurrence determination section 3 connected thereto. The busy condition occurrence determination section 3 has the data transmission condition determination section 4 connected thereto. The data transmission condition determination section 4 further has the data transmission condition transmission section 1 connected thereto.

The actual data transmission condition acquisition section 2 monitors data transmitted on the down channel of the second line B to obtain actual data length time $d_{dr}$ and actual data transmission interval time $d_{tr}$ as actual data transmission conditions.

The busy condition occurrence determination section 3 determines whether or not a busy condition is occurring on the channel of the line B by comparing the maximum data length time dm and maximum data transmission interval time tm set for the down channel of the line B or obtained as in (iii) to the actual data length time $d_r$ and actual data transmission interval time $t_r$ obtained by the actual data transmission condition acquisition section 2.

The data transmission condition determination section 4 determines a data transmission condition for the down channel of the line C based on the results output by the busy condition occurrence determination section 3 using a predetermined allocation criteria in such a way that data can be transferred efficiently on the up line of the line B without causing a busy condition thereon.

The data transmission condition section 1 transmits the data length time $d_C$ and data transmission interval time $t_c$ of transmitted data to the terminal 40 via the transmitter 35a as a data transmission condition for the down channel of the line C.

[Terminal 40]

The terminal 40 has a transmitter 45 and a receiver 46 both connected to the line C. In the line C, the direction in which information is communicated from the switching device 30 to the terminal 40 is called an up direction, while the direction in which information is communicated from the terminal 40 to the switching device 30 is called a down direction.

A control section 47 is connected to both the transmitter 45 and the receiver 46. The control section 47 has the data transmission condition reception section 11 and the data reception section 12 therein, as shown in FIG. 23.

The data transmission condition reception section 11 receives a data transmission condition for the down channel of the line C.

The data transmission section 12 transmits data under the data transmission condition received by the data transmission condition reception section 11 or a lower condition.

<Flow of processing in Embodiment 1>

Three processing flows shown in the following (i) to (iii) are described as processing flows in Embodiment 1 with reference to the drawings.

Figure 27:
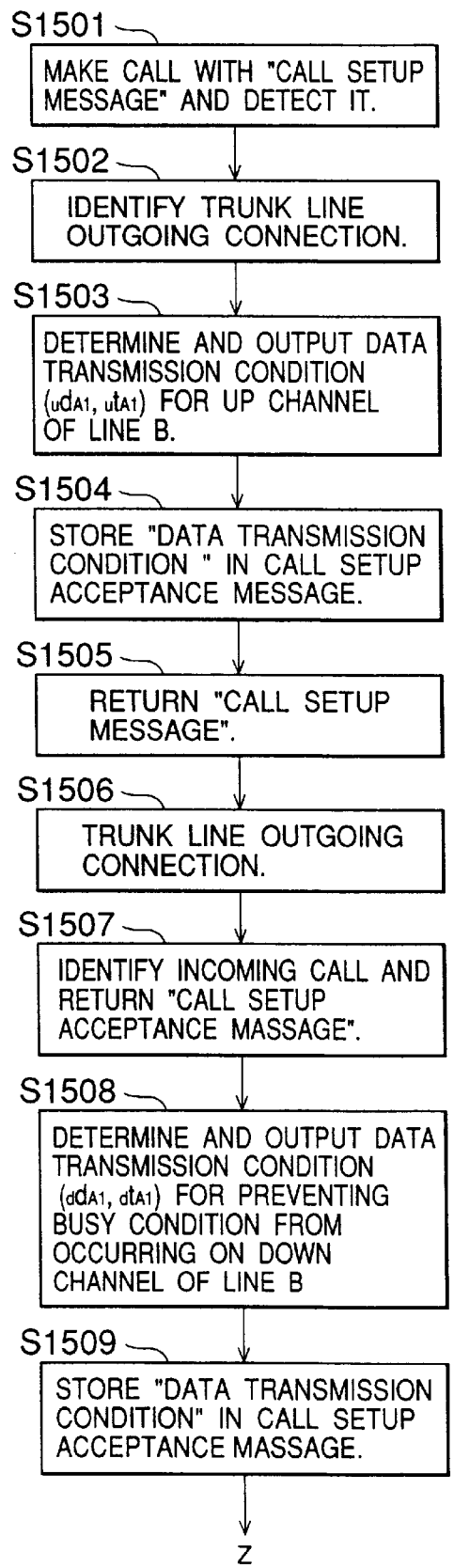
FIG. 27 is a flowchart (1) showing the processing of a "data transmission condition" in embodiment 1 beginning with a call from a terminal 10 and ending with a response from a terminal 40.
Figure 28:
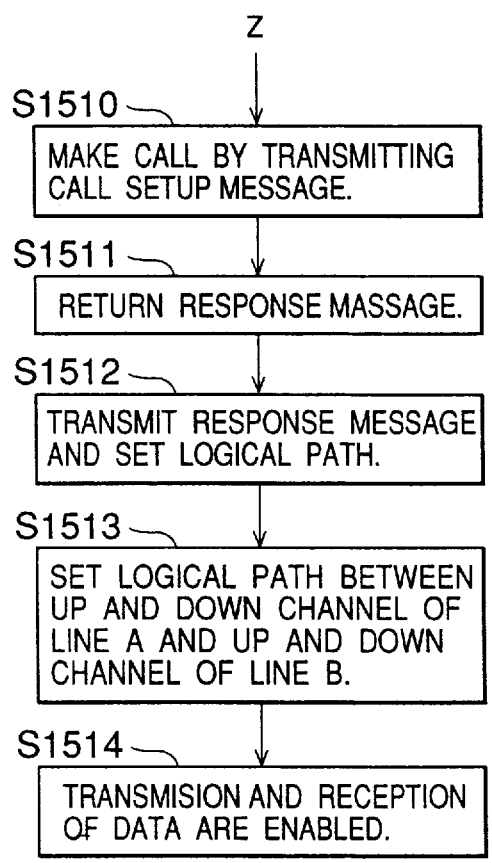
FIG. 28 is a flowchart (2) showing the processing of a "data transmission condition" in embodiment 1 beginning with a call from a terminal 10 and ending with a response from a terminal 40.

(i) A flow of processing a "data transmission condition" from calling of the terminal 10 to a response of the terminal 40 (see FIGS. 27 and 28)

Figure 29:
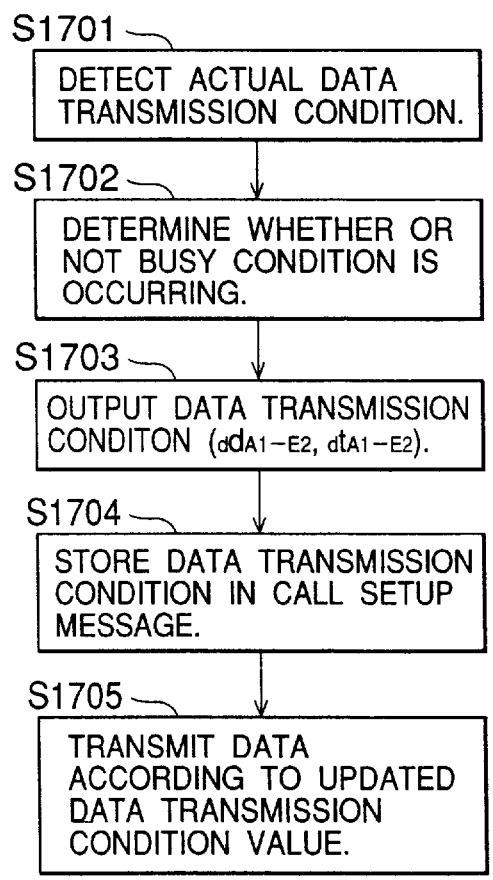
FIG. 29 is a flowchart showing the processing of a "data transmission condition" during communication associated with the terminal 10.

(ii) A flow of updating a "data transmission condition" during the communication of the terminal 10 (see FIG. 29)

Figure 30:
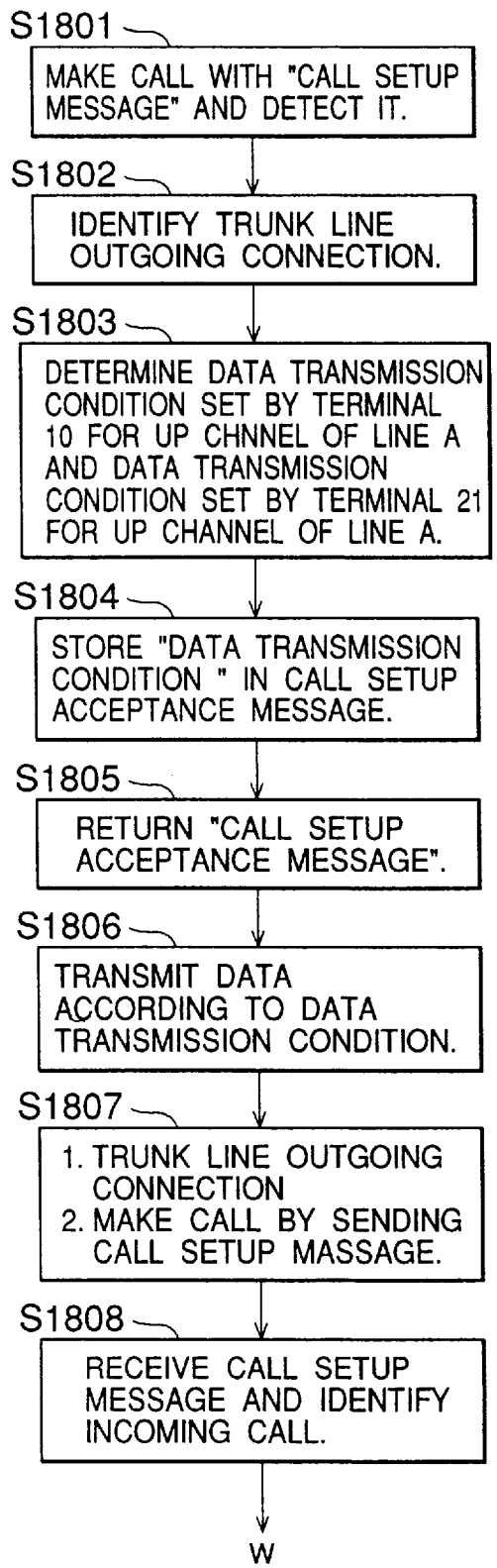
FIG. 30 is a flowchart (1) showing the processing of a "data transmission condition" with the communication between terminals 11 and 41 added in embodiment 1.

(iii) A flow of processing a "data transmission condition" with a terminal 11 and a terminal 41 added (see FIGS. 30 and 31)

<Flow of processing a "data transmission condition" from a call from the terminal 10 until a response from the terminal 40>

During this processing, the terminal 10 makes a call to request a connection to the terminal 40 and the switching devices 20 and 30 execute required connections. The determination of a "condition for transmissions" from the terminal 10 to the terminal 40 and the transmission and reception of a data transmission condition during this process are described.

At step 1501, the terminal 10 specifies the address of the terminal 40 to communicate with, and makes a call by delivering a "call setup message". The switching device 20 receives the "call setup message" to detect the call.

The call setup message passes from the control section 17 of the terminal 10 through the control section 15, the up channel of the line A, and the receiver 26a of the switching device 20 to the control section 27 of the switching device 20.

At step 1502, the switching device 20 analyzes the address to determine that this is a trunk line outgoing connection using the up channel of the line B.

At step 1503, the data transmission condition determination section 4 of the control section 27 of the switching device 20 determines a "data transmission condition ($_u d_{A1}$, $_u t_{A1}$) value set by the terminal 10 for the up channel of the line A" for preventing a busy condition from occurring on the up channel of the line B and outputs it to the data transmission condition transmission section 1.

The data transmission condition determination section 4 determines that other traffic that uses the up channel of the line B is not occurring and that the traffic of the terminal 10 can occupy the up channel of the line B, and sets the data transmission condition ($_u d_{A1}$, $_u t_{A1}$) for the up channel of the line A such that the terminal 10 operates in such a manner that the condition meets Equation (4)

$$(_u d_{A1}, _u t_{A1}) = (_u d_{Bs}, _u t_{Bs}) = (_u d_{Bm}, _u t_{Bm}) \qquad (4)$$

At step 1504, the data transmission condition transmission section 1 of the control section 27 of the switching device 20 stores the "data transmission condition ($_u d_{A1}$, $_u t_{A1}$)" in a "call setup acceptance message" that will be returned to the terminal 10.

At step 1505, the switching device 20 returns a "call setup acceptance message" to the terminal 10 to inform it that the call has been accepted. The "data transmission condition" thus reaches the control section 17 of the terminal 10. The terminal 10 prepares for data transmission according to the data transmission condition ($_u d_{A1}$, $_u t_{A1}$).

The call setup acceptance message passes from the control section 27 of the switching device 20 through the transmitter 25a, the up channel of the line A, and the receiver 16 of the terminal 10 to the control section 17 of the terminal 10.

At step 1506, the switching devices 20 attempts to establish a trunk line outgoing connection with the switching device 30. The switching device 20 makes a call by sending a "call setup message" with an address stored therein to the switching device 30.

At step 1507, the switching device 30 receives the "call setup message" and analyzes the address to determine that this is an incoming call to the terminal 40. The switching device 30 returns a "call setup acceptance message" to the switching device 20.

At step 1508, the data transmission condition determination section 4 of the switching device 30 determines a "data transmission condition ($_d d_{c4}$, $_d t_{c4}$) value for preventing a busy condition from occurring on the down channel of the line B and outputs it to the data transmission condition transmission section 1.

The data transmission condition determination section 4 determines that other traffic that uses the down channel of the line B is not occurring and that the traffic of the terminal 40 can occupy the down channel of the line B, and sets the data transmission condition ($_d d_{c4}$, $_d t_{c4}$) for the down channel of the line C such that the terminal 40 operates in such a manner that the condition meets Equation (5)

$$(_d d_{C4}, _d t_{C4}) = (_d d_{Bs}, _d t_{Bs}) = (_d d_{Bm}, _d t_{Bm}) \quad (5)$$

wherein (ddBs, dtBs) is a "data transmission condition with a margin on the safer side" and ($_d d_{Bm}$, $_d t_{Bm}$) is a "maximum data transmission condition" value for the down channel of the line B.

At step 1509, the data transmission condition transmission section 1 of the control section 37 of the switching device 30 stores the "data transmission condition ($_d d_{c4}$, $_d t_{c4}$)" in a "call setup message" that will be sent to the terminal 40.

At step 1510, the switching device 30 calls the terminal 40 by returning a "call setup acceptance message" to it. The "data transmission condition" thus reaches the control section 47 of the terminal 40. The terminal 40 prepares for data transmission according to the data transmission condition ($_d d_{c4}$, $_d t_{c4}$).

At step 1511, the terminal 40 returns a "response message" to the switching device 30 to respond to the call. The switching device 30 receives the "response message" to determine that the terminal 40 has responded.

At step 1512, the switching device 30 transmits a "response message" to the switching device 20. The switching device 30 also sets a logical path between the up and down channels of the line C connected to the terminal 40 and the up and down channels of the line B.

At step 1513, the switching device 20 receives the response message to determine that the terminal 40 has responded. It then sets a logical path between the up and down channels of the line A connected to the terminal 10 and the up and down channels of the line B.

At step 1514, the terminals 10 and 40 can transmit and receive data to and from each other by setting a logical path between the switching devices 20 and 30. The terminal 10 transmits data on the up channel of the line A according to the "data transmission condition ($_u d_{A1}$, $_u t_{A1}$). On the other hand, the terminal 40 sends data on the down channel of the line C according to the "data transmission condition ($_d d_{c4}$, $_d t_{c4}$).

<Flow of updating a "data transmission condition" during the communication of the terminal 10>

If the usage of the up channel of the line B decreases to half its previous value while the terminal 10 is transmitting or receiving data, the switching device 20 needs to control the amount of data to be transmitted from the terminal 10.

In this case, this process updates the "data transmission condition" value and outputs it to the terminal 10.

The "data transmission condition" for the terminal 40 can also be updated as described below for the "down channel of the line B" and the "down channel of the line C" using the actual data transmission condition acquisition section 2, the busy condition occurrence determination section 3, and the data transmission condition determination section 4 of the control section 37 of the switching device 30.

Furthermore, updating can be performed only for the terminal 10 to enable data transfer between the terminal 10 and the terminal 40 with different line usages for the up and the down channels.

At step 1701, the actual data transmission condition acquisition section 2 of the control section 27 of the switching device 20 monitors via the transmitter 25*b* bit strings flowing on the up channel of the line B. It then detects an "actual data transmission condition ($_u d_{Br}$, $_u t_{Br}$) and outputs the transmission condition value to the busy condition occurrence determination section 3.

1) N-th data length time: $_u d_{Br}$
2) Occurrence interval time between N-th piece of data and N+1-th piece of data: $_u t_{Br}$ At step 1702, the busy condition occurrence determination section 3 of the control section 27 of the switching device 20 compares the "actual data transmission condition ($_u d_{Br}$, $_u t_{Br}$) for the up channel of the line B according to a processing flow comprising the following steps 1 to 6.

[Step 1]
It calculates Equation (1).

$$_u d_{Bm} - _u d_{Br} = X \quad (1)$$

[Step 2]
If in Equation (1), X is 0 or +j that is a margin until a busy condition occurs, it calculates Equation (2).

$$(_u d_{Bm} + _u t_{Bm}) - (_u d_{Br} + _u t_{Br}) = Z \quad (2)$$

[Step 3]
If in Equation (2), Z is 0 or +p that is a margin until a busy condition occurs, it determines that a busy condition is not occurring.

[Step 4]
If in Equation (1), X is −k that represents a negative quantity, it calculates Equation (3).

$$(_u d_{Bm} + _u t_{Bm}) - (_u + d_{Br} + _u t_{Br}) = Y \quad (3)$$

[Step 5]
If in Equation (3), Y is 0 or +m that is a margin until a busy condition occurs, it determines that a busy condition is not occurring.

[Step 6]
If in Equation (3), Y is −n that represents a negative quantity or if in Equation (2), Z is −q that represents a negative quantity, it determines that a busy condition is occurring.

It finally determines whether or not a busy condition will not occur, obtains differential values (X, Y, Z), and outputs them to the data transmission condition determination section 4.

The results of the above processing is shown in the following 1) to 3).

1) ($_u d_{A1}$, $_u t_{A1}$) = ($_u d_{Bm}$, $_u t_{Bm}$) has been set and transmitted to the terminal 10.
2) The terminal 10 has sent data on the up channel of the line A according to this value. Since the switching device 20 has relayed this data on the up channel of the line B, ($_u d_{A1}$, $_u t_{A1}$) = ($_u d_{Br}$, $_u t_{Br}$) = ($_u d_{Bm}$, $_u t_{Bm}$) has been established.
3) Thus, as a result of the processing flow of the busy condition occurrence determination section 3, it has been determined that a busy condition will not occur and the differential values X, Y, and Z are as follows.

$X = {}_u d_{Bm} - {}_u t_{A1}$ $X = 0$ ... Thus, Y is not present.

$Z = ({}_u d_{Bm} + {}_u t_{Bm}) - ({}_u d_{Br} + {}_u t_{Br})$ $Z = 0$

At step 1703, to reduce the usage of the up channel of the line B to half its current value, the data transmission condition determination section 4 of the control section 27 of the switching device 20 performs the following updating processing to output to the data transmission condition transmission section 1 a "data transmission condition $({}_u d_{A1-E2}, {}_u t_{A1-E2})$ value for the up channel of the line A" for reducing the usage of the up channel of the line B to half its current value.

1) According to the results of processing by the busy condition occurrence determination section 3, the value of the "data transmission condition" during the current process is as follows.

$$({}_u d_{Br}, {}_d t_{Br}) = ({}_u d_{Bm}, {}_d t_{Bm}) = ({}_u d_{A1}, {}_u t_{A1})$$

Figure 25A:
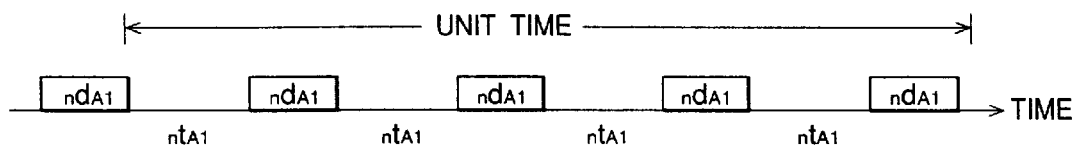
FIG. 25 describes the relationship between data length time and data transmission interval time in embodiment 1.
Figure 25B:
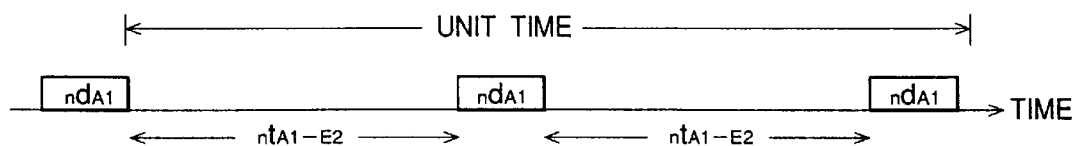

2) If the data length time (d) of transmitted data is fixed, the data transmission time interval (t) may be increased to reduce the usage of the up channel of the line B. Based on FIG. 25 showing the relationship between the data length time (d) and the data transmission time interval (t), Equations (6) and (7) are established.

$${}_u d_{A1-E2} = {}_u d_{A1} \tag{6}$$

$${}_u d_{A1-E2} = {}_u t_{A1} + {}_u d_{A1} + {}_u t_{A1} \tag{7}$$

At step 1704, the data transmission condition transmission section 1 of the control section 27 of the switching device 20 stores in a "call setup message" the updated "data transmission condition $({}_u d_{A1-E2}, {}_u t_{A1-E2})$" for the up channel of the line A, and sends the message to the terminal 10, thereby instructing the terminal 10 to follow the updated "data transmission condition".

At step 1705, the terminal 10 transmits data according to the updated "data transmission condition $({}_u d_{A1-E2}, {}_u t_{A1-E2})$" for the up channel of the line A.

<Flow of processing a "data transmission condition" with the terminals 11 and 41 added>

If the terminal 11 makes a call and data transfer between the terminal 11 and the terminal 41 is enabled through connection processing by the switching devices 20 and 30, the up and down channels of the line B execute transmissions by multiplexing data "between the terminal 10 and the terminal 40" and data "between the terminal 11 and the terminal 41".

Figure 26:
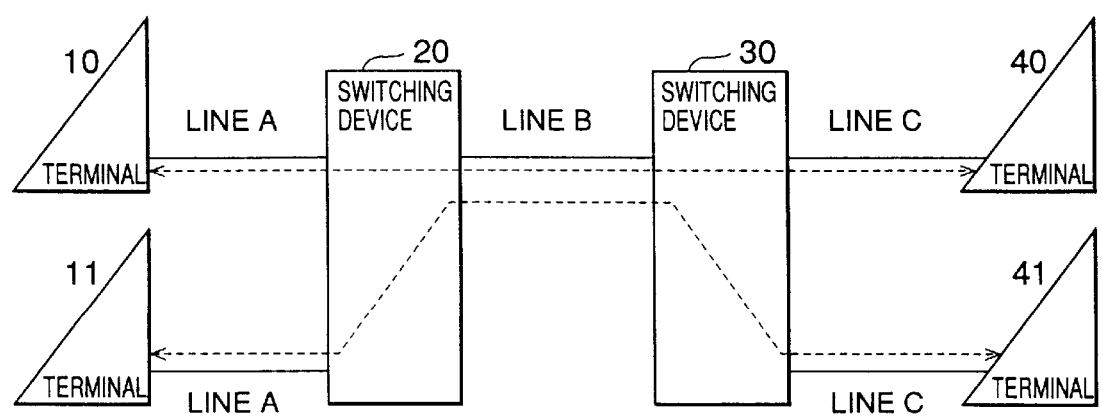
FIG. 26 shows the outline of connections to describe the flow of processing of a "data transmission condition" with the communication between terminals 11 and 41 added in embodiment 1.

FIG. 26 is a schematic FIG. of connections in this processing flow.

The switching device 20 transfers data transmitted on the up channel of the line A and data sent on the up channel of the line B without causing a busy condition thereon. To do this, the switching device 20 controls the amount of data delivered from the terminal 10 so that data transmitted from the terminal 11 and data sent from the terminal 10 can be multiplexed.

On the other hand, the switching device 30 transfers data transmitted on the down channel of the line C and data sent on the down channel of the line B without causing a busy condition thereon. To do this, the switching device 30 controls the amount of data delivered from the terminal 40 so that data transmitted from the terminal 41 and data sent from the terminal 40 can be multiplexed.

The amount of data transmitted and received between the terminal 10 and the terminal 40 and between the terminal 11 and the terminal 41 must be uniform per unit time.

<Call from the terminal 11>

The flow of processing wherein a call is made by the terminal 11 is described.

At step 1801, the terminal 11 specifies the address of the terminal 41 to communicate with, and makes a call by delivering a "call setup message". The switching device 20 receives the "call setup message" to detect the call.

At step 1802, the switching device 20 analyzes the address to determine that this is a trunk line outgoing connection using the up channel of the line B.

At step 1803, the data transmission condition determination section 4 of the control section 27 of the switching device 20 performs the following processing in 1) to 3) to determine a "data transmission condition $({}_u d_{A1-E2}, {}_u t_{A1-E2})$ value set by the terminal 10 for the up channel of the line A" and a "data transmission condition $({}_u d_{A21}, {}_u t_{A21})$ value set by the terminal 11 for the up channel of the line A" for preventing a busy condition from occurring on the up channel of the line B and outputs them to the data transmission condition transmission section 1.

1) The data transmission condition determination section 4 determines that the up channel of the line B has already been occupied by data transmitted by the terminal 10. It also determines that the up channel of the line B be shared evenly by the terminal 10 and 11.

2) The data transmission condition determination section 4 determines a value for reducing the line usage to half its current value from Equations (8) and (9) based on the "data transmission condition $({}_u d_{A1-E2}, {}_u t_{A1-E2})$" set by the terminal 10 for the up channel of the line B.

$${}_u d_{A1-E2} = {}_u d_{A1} \tag{8}$$

$${}_u t_{A1-E2} = {}_u t_{A1} + {}_u d_{A1} + {}_u t_{A1} \tag{9}$$

3) The data transmission condition determination section 4 determines a value for reducing the line usage to half its current value from Equations (10) and (11) based on the "data transmission condition $({}_u d_{A21}, {}_u t_{A21})$" set by the terminal 11 for the up channel of the line A.

$${}_u d_{A21} = {}_u d_{A1} \tag{10}$$

$${}_u t_{A21} = {}_u t_{A1} + {}_u d_{A1} + {}_u t_{A1} \tag{11}$$

At step 1804, the data transmission condition transmission section 1 of the control section 27 of the switching device 20 stores in a "call setup message" the updated "data transmission condition $({}_u d_{A1-E2}, {}_u t_{A1-E2})$" value for the up channel of the line A from the terminal 10, and outputs the message to the terminal 10, thereby instructing the terminal 10 to follow the updated "data transmission condition".

Furthermore, the data transmission condition transmission section 1 stores the "data transmission condition $({}_u d_{A21}, {}_u t_{A21})$" value in a "call setup acceptance message".

At step 1805, the switching device 20 returns a "call setup acceptance message" to the terminal 11 to inform it that the call has been accepted. This causes the "data transmission condition" to be input to the control section (not shown) of the terminal 11. The terminal 11 prepares for data transmission according to the data transmission condition $({}_u d_{A21}, {}_u t_{A21})$.

At step 1806, the terminal 10 transmits data on the up channel of the line A according to the received "data transmission condition $({}_u d_{A1-E2}, {}_u t_{A1-E2})$" value for the up channel of the line A.

<Calling the terminal 41>

The flow of the operation of calling the terminal 41 is described.

At step 1807, the switching device 20 attempts to establish a trunk line outgoing connection with the switching device 30 wherein the terminal 11 can make a call. The switching device makes 20 a call by transmitting a "call setup message" with an address stored therein to the switching device 30.

At step 1808, the switching device 30 receives the "call setup message" and analyzes the address to determine that this is an incoming call to the terminal 41. The switching device 30 returns a "call setup acceptance message" to the switching device 20.

At step 1809, the data transmission condition determination section 4 of the control section 37 of the switching device 30 performs the following processing in 1) to 3) to determine a "data transmission condition $({_d}d_{C4\text{-}E2}, {_d}t_{C4\text{-}E2})$ value set by the terminal 40 for the down channel of the line C" and a "data transmission condition $({_d}d_{C24}, {_d}t_{C24})$ value set by the terminal 41 for the down channel of the line C" for preventing a busy condition from occurring on the down channel of the line B and outputs them to the data transmission condition transmission section 1.

1) The data transmission condition determination section 4 determines that the down channel of the line B has already been occupied by data transmitted by the terminal 40. It also determines that the down channel of the line B be shared evenly by the terminal 40 and 41.

2) The data transmission condition determination section 4 determines a value for reducing the line usage to half its current value from Equations (12) and (13) based on the "data transmission condition $({_u}d_{C4\text{-}E2}, {_u}t_{C4\text{-}E2})$" set by the terminal 40 for the down channel of the line C.

$${_u}d_{C4\text{-}E2} = {_u}d_{A1} \quad (12)$$

$${_u}t_{C4\text{-}E2} = {_d}t_{A1} + {_u}d_{A1} + {_u}t_{A1} \quad (13)$$

3) The data transmission condition determination section 4 determines a value for reducing the line usage to half its current value from Equations (14) and (15) based on the "data transmission condition $({_d}d_{C24}, {_d}t_{C24})$" set by the terminal 41 for the down channel of the line C.

$${_u}d_{C24} = {_u}d_{A1} \quad (14)$$

$${_d}t_{C24} = {_u}t_{A1} + {_u}d_{A1} + {_u}t_{A1} \quad (15)$$

At step 1810, the data transmission condition transmission section 1 of the control section 37 of the switching device 30 stores in a "call setup message" the updated "data transmission condition $({_d}d_{C4\text{-}E2}, {_d}t_{C4\text{-}E2})$" value for the down channel of the line C from the terminal 40, and outputs the message to the terminal 40, thereby instructing the terminal 10 to follow the updated "data transmission condition".

Furthermore, the data transmission condition transmission section 1 stores the "data transmission condition $({_d}d_{c24}, {_d}t_{c24})$" in a "call setup acceptance message".

At step 1811, the terminal 40 transmits data on the down channel of the line C according to the received "data transmission condition $({_d}d_{C4\text{-}E2}, {_d}t_{C4\text{-}E2})$" value for the down channel of the line C.

At step 1812, the switching device 30 sends a "call setup message" to call the terminal 41. This causes the "data transmission condition $({_d}d_{C24}, {_d}t_{C24})$" to be output to the control means (not shown) of the terminal 41.

At step 1813, the terminal 41 returns a "response message" to the switching device 30 to respond to the call. The switching device 30 receives the "response message" to determine that the terminal 40 has responded.

At step 1814, the switching device 30 transmits a "response message" to the switching device 20. The switching device 30 also sets a logical path between the up and down channels of the line C connected to the terminal 41 and the up and down channels of the line B.

At step 1815, the switching device 20 receives the response message to determine that the terminal 41 has responded. It then sets a logical path between the up and down channels of the line A connected to the terminal 11.

At step 1816, the terminals 11 and 41 can transmit and receive data to and from each other by setting a logical path between the switching devices 20 and 30. The terminal 10 transmits data on the up channel of the line A according to the updated "data transmission condition $({_u}d_{A21\text{-}E2}, {_u}t_{A1\text{-}E2})$. On the other hand, the terminal 40 sends data on the down channel of the line C according to the updated "data transmission condition $({_d}d_{C4\text{-}E2}, {_d}t_{C4\text{-}E2})$.

Furthermore, the terminal 11 transmits data on the up channel of the line A according to the updated "data transmission condition $({_u}d_{A21}, {_u}t_{A21})$. On the other hand, the terminal 41 sends data on the down channel of the line C according to the "data transmission condition $({_d}d_{C24}, {_d}t_{C24})$.

<Advantages of Embodiment 1>

By performing the above processing, data can be transferred between the terminal 10 and the terminal 40 and between the terminal 11 and the terminal 41 at the best channel usage without causing a busy condition on the up channel of the line B.

[Embodiment 2]

<Overall configuration of Embodiment 2>

Figure 32:
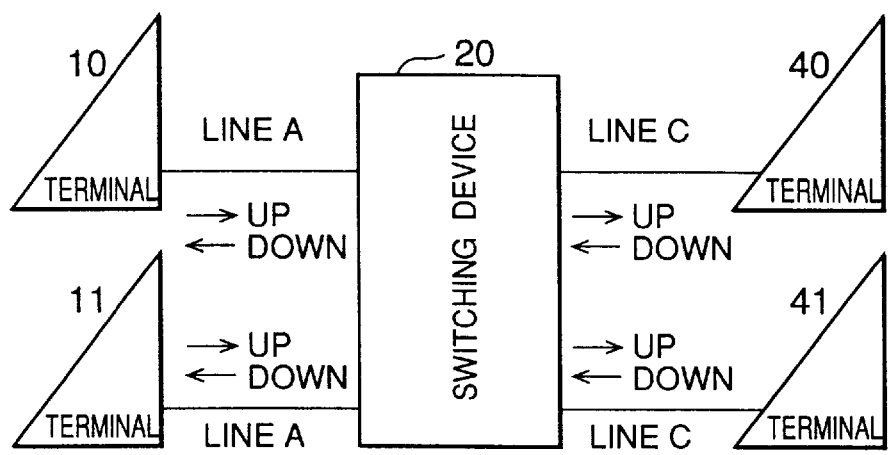
FIG. 32 is a general block diagram of embodiment 2.

Next, the overall configuration of Embodiment 2 is described, which is shown in FIG. 32.

As is apparent from FIG. 32, Embodiment 2 has the same configuration as Embodiment 1 except that Embodiment 2 does not include the switching device 30 (thus, does not include the line B) and that the terminals 11 and 41 are connected to the switching device 20. Only this difference is thus described; the like parts carry the same reference numerals and their description is omitted.

<Internal configuration of Embodiment 2>

Figure 33:
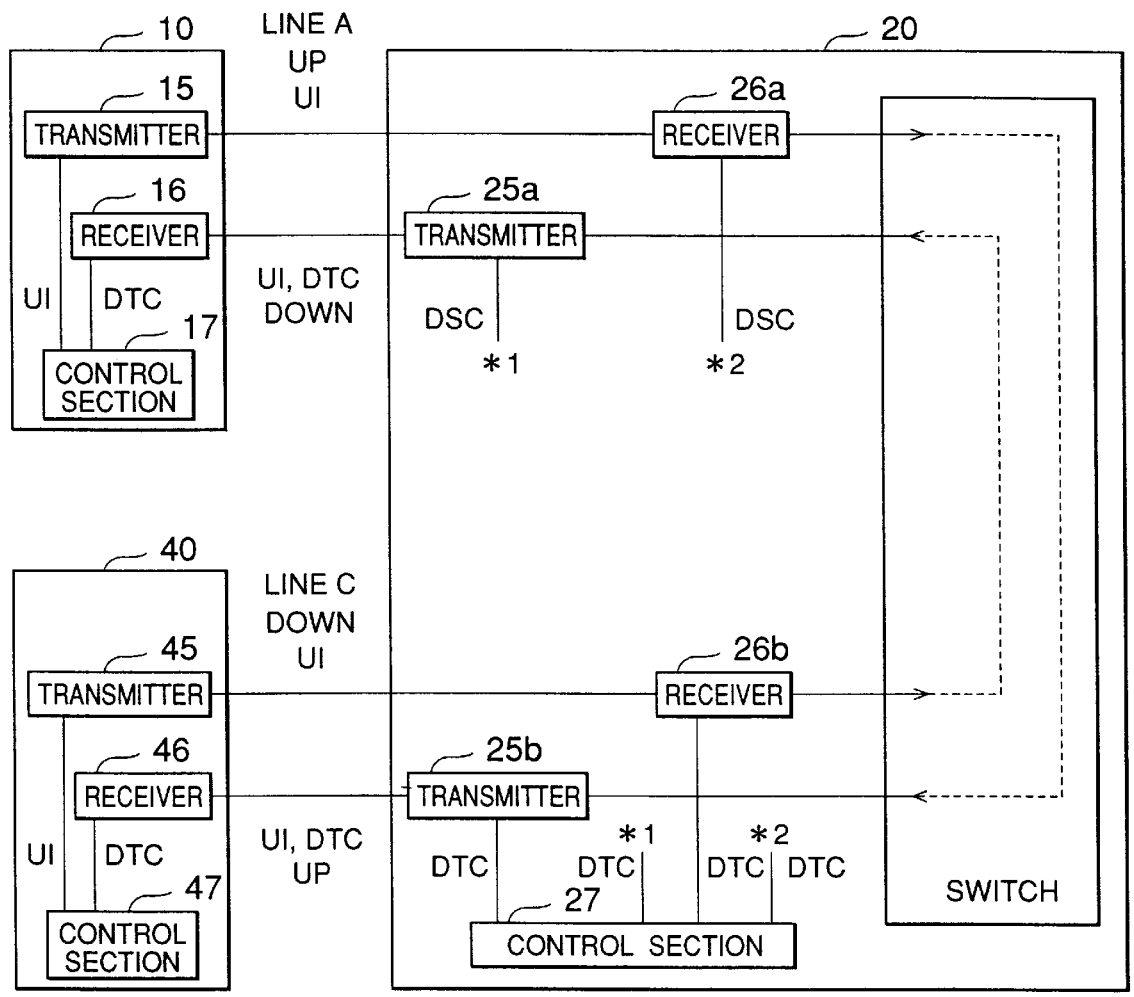
FIG. 33 is a block diagram of the internal configuration of embodiment 2.

Next, the internal configuration of Embodiment 2 is described, which is shown in FIG. 33.

[Switching device 20]

The switching device 20 has the transmitter 25*a* and the receiver 26*a* both connected to the line A. Both the transmitter 25*a* and the receiver 26*a* are connected to the switch 28. The switch 28 is connected to both the transmitter 25*b* and the receiver 26*b*. Both the transmitter 25*b* and the receiver 26*b* are connected to the line C.

In the line A, the direction in which information is communicated from the terminal 10 to the switching device 20 is called an up direction, while the direction in which information is communicated from the switching device 20 to the terminal 10 is called a down direction. On the other hand, in the line C, the direction in which information is communicated from the switching device 20 to the terminal 40 is called an up direction, while the direction in which information is communicated from the terminal 40 to the switching device 20 is called a down direction.

The control section 27 is connected to both the transmitters 25*a*, 25*b* and the receivers 26*a*, 26*b*. The control section 27 has the actual data transmission condition acquisition section 2 therein, as shown in FIG. 24. The actual data transmission condition acquisition section 2 is connected to the busy condition occurrence determination section 3. The busy condition occurrence determination section 3 is connected to the data transmission condition determination section 4. The data transmission condition determination section 4 is connected to the data transmission condition transmission section 1.

The actual data transmission condition acquisition section 2 monitors data transmitted on the down channel of the line C to obtain actual data length time dr and actual data transmission interval time tr as actual data transmission conditions.

The busy condition occurrence determination section 3 determines whether or not a busy condition is occurring on the down channel of the line C by comparing the maximum data length time dm and maximum data transmission interval time tm as the data transfer condition that prevents a busy condition from occurring on the up channel of the line C and is still efficient, to the actual data length time dr and actual data transmission interval time tr obtained by the actual data transmission condition acquisition section 2.

The data transmission condition determination section 4 determines a data transmission condition for the up channel of the line A based on the results output by the busy condition occurrence determination section 3 using a predetermined allocation criteria in such a way that data can be transferred efficiently on the up line of the line C without causing a busy condition thereon.

The data transmission condition section 1 transmits the data length time (d) and data transmission interval time (t) of transmitted data to the terminal 10 as a data transmission condition for the up channel of the line A.

<Flow of processing in Embodiment 2>

The flow of processing in Embodiment 2 is the same as in Embodiment 1, so the description is omitted.

[Embodiment 3]

<Overall configuration of Embodiment 3>

Figure 34:
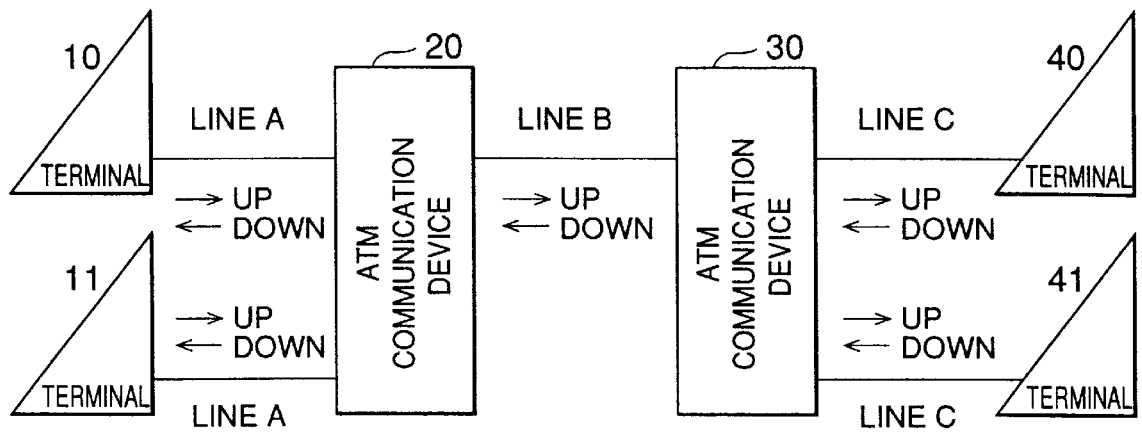
FIG. 34 is a general block diagram of embodiment 3.

Next, the overall configuration of Embodiment 3 is described, which is shown in FIG. 34.

As is apparent from FIG. 34, Embodiment 3 has the same configuration as Embodiment 1 except that the switching device 20 in Embodiment 1 is substituted by an ATM communication device 20 and that the switching device 30 in Embodiment 1 is substituted by an ATM communication device 30. Only this difference is thus described; the like parts carry the same reference numerals and their description is omitted.

The ATM communication devices 20 and 30 do not involve call connection processing, and in this case, one or more permanent virtual channel (PVC) is set in advance between the terminals to enable communication between them.

<Flow of processing in Embodiment 3>

Figure 35:
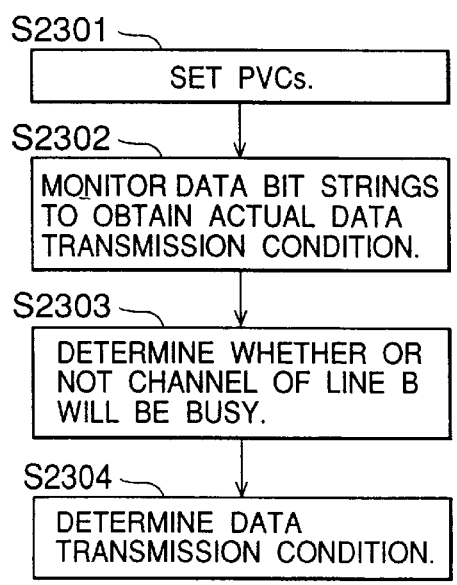
FIG. 35 is a flowchart showing processing in embodiment 3.

The flow of processing in Embodiment is described with reference to FIG. 35.

At step 2301, the switch 28 for the ATM communication device 20 and the switch 38 for the ATM communication device 30 set the following PVCs in 1) to 6). A known setting method is used.

1) Up channel between the terminal 10 and the ATM communication device 20
2) Down channel between the terminal 10 and the ATM communication device 20
3) Up channel between the ATM communication devices 20 and 30
4) Down channel between the ATM communication devices 20 and 30
5) Up channel between the terminal 40 and the ATM communication device 30
6) Down channel between the terminal 40 and the ATM communication device 30

At step 2302, due to the lack of call connection processing, the ATM communication device 20 uses the actual data transmission condition acquisition section 2 of the control section 27 to monitor data bit strings on the up channel of the line B. It thus obtains the actual data transmission condition ($_u d_{Br}, _u t_{Br}$) of the up channel of the line B to output it to the busy condition occurrence determination section 3.

On the other hand, the ATM communication device 30 uses the actual data transmission condition acquisition section 2 of the control section 37 to monitor data bit strings on the down channel of the line B. It thus obtains the actual data transmission condition ($_d d_{Br}, _d t_{Br}$) of the down channel of the line B to output it to the busy condition occurrence determination section 3.

At step 2303, the busy condition occurrence determination section 3 of the control section 27 of the ATM communication device 20 determines whether or not the up channel of the line B will be busy, and determines the value of the difference between the actual data transmission condition of the up channel of the line B and the maximum data transmission condition for this channel to output it to the data transmission condition determination section 4. The busy condition occurrence determination section 3 of the control section 37 of the ATM communication device 30 determines whether or not the down channel of the line B will be busy, and determines the value of the difference between the actual data transmission condition of the down channel of the line B and the maximum data transmission condition for this channel to output it to the data transmission condition determination section 4.

At step 2304, the data transmission condition determination section 4 of the control section 27 of the ATM communication device 20 determines a data transmission condition for the up channel of the line A from the terminal 10 to output this data transmission condition to the terminal 10.

On the other hand, the data transmission condition determination section 4 of the control section 27 of the ATM communication device 30 determines a data transmission condition for the down channel of the line C from the terminal 40 to output this data transmission condition to the terminal 40.

[Embodiment 4]

<Overall configuration of Embodiment 4>

Figure 36:
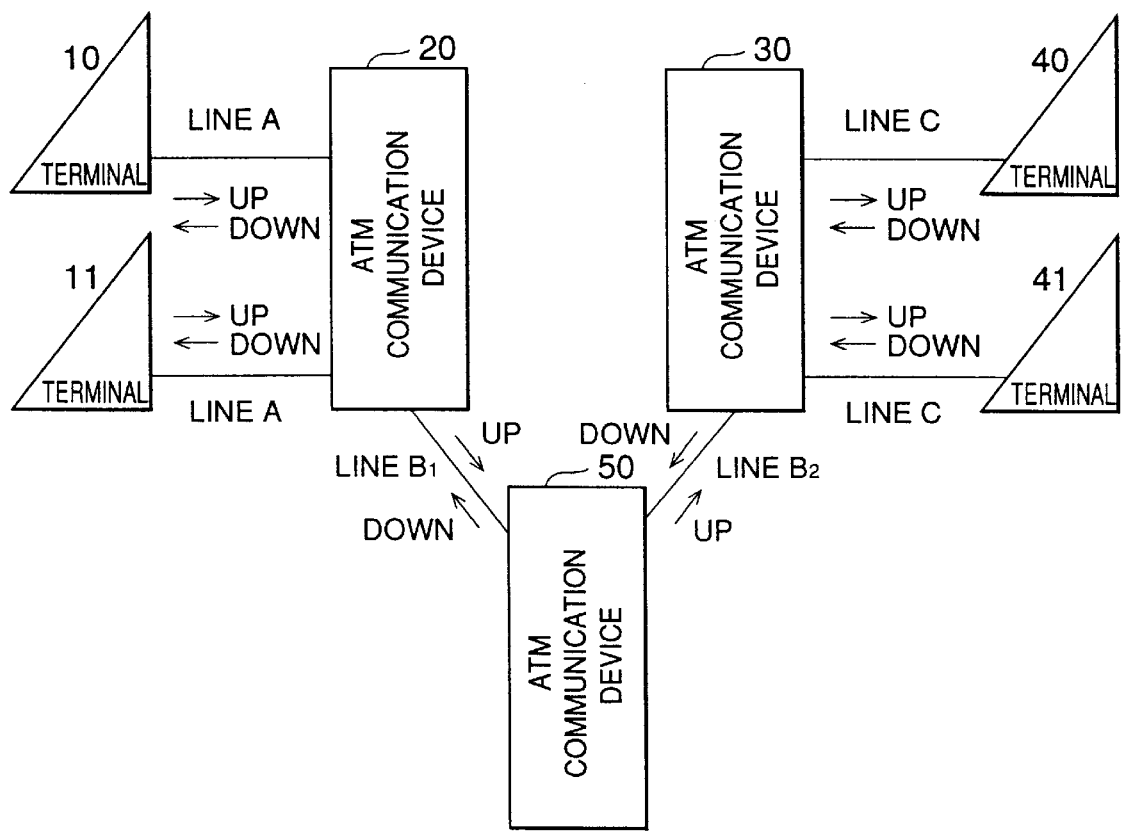
FIG. 36 is a general block diagram of embodiment 4.

Next, the overall configuration of Embodiment 4 is described, which is shown in FIG. 36.

As is apparent from FIG. 36, Embodiment 4 has the same configuration as Embodiment 3 except that an ATM communication device 50 is provided between the ATM communication device 20 and 30 as a trunk device. Only this difference (the ATM communication device 50) is thus described; the like parts carry the same reference numerals and their description is omitted.

The ATM communication device 50 is connected to the ATM communication device 20 via the line $B_1$ and to the ATM communication device 30 via the line $B_2$. The lines $B_1$ and $B_2$ are both trunk lines. In the line $B_1$, the direction in which information is communicated from the ATM communication device 20 to the ATM communication device 50 is called an up direction, while the direction in which information is communicated from the ATM communication device 50 to the ATM communication device 20 is called a down direction. In the line $B_2$, the direction in which information is communicated from the ATM communication device 50 to the ATM communication device 30 is called an up direction, while the direction in which information is communicated from the ATM communication device 30 to the ATM communication device 50 is called a down direction.

<Flow of processing in Embodiment 4>

Figure 37:
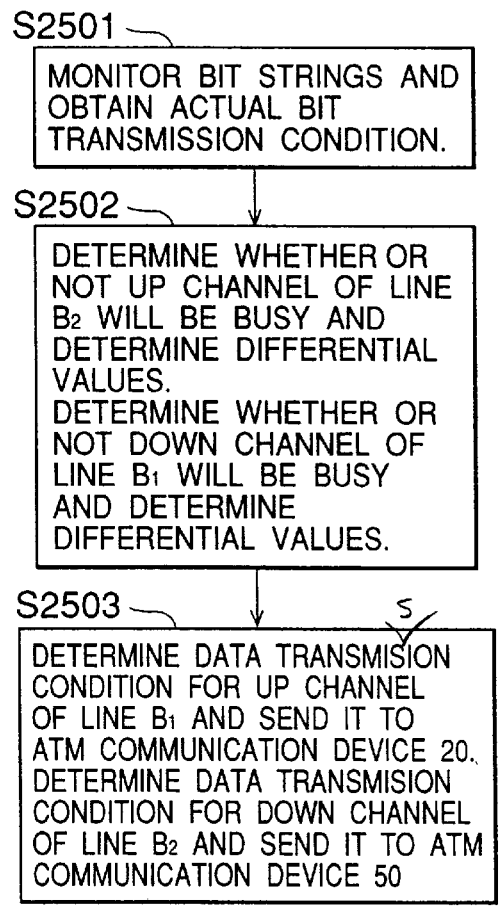
FIG. 37 is a flowchart showing processing in embodiment 4.
Figure 38:
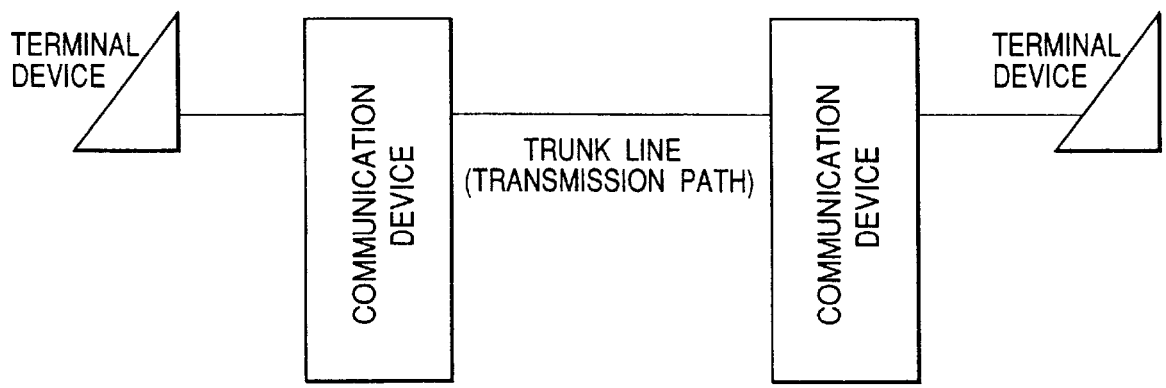
FIG. 38 is a block diagram of a conventional method for transferring data.

The flow of processing in Embodiment 4 is described with reference to FIG. 37.

At step 2501, the ATM communication device 50 monitors data bit strings on the up channel of the line B2. It thus obtains the actual data transmission condition ($_u d_{B2r}$, $_u t_{B2r}$) of the up channel of the line B2 to output it to the busy condition occurrence determination section 3 (having the same configuration as the busy condition occurrence determination section 3 of the switching device 20 in Embodiment 1) provided in the control section (not shown).

The ATM communication device 50 also monitors data bit strings on the down channel of the line $B_1$. It thus obtains the actual data transmission condition ($_d d_{B1r}$, $_d t_{B1r}$) of the down channel of the line $B_1$ to output it to the busy condition occurrence determination section 3.

At step 2502, the busy condition occurrence determination section 3 determines whether or not the up channel of the line $B_2$ will be busy, and determines the value of the difference between the actual data transmission condition of the up channel of the line $B_2$ and the maximum data transmission condition for this channel to output it to the data transmission condition determination section 4. Furthermore, the busy condition occurrence determination section 3 determines whether or not the down channel of the line $B_1$ will be busy, and determines the difference between the actual data transmission condition of the down channel of the line $B_1$ and the maximum data transmission condition for this channel to output it to the data transmission condition determination section 4.

At step 2503, the data transmission condition determination section 4 determines a data transmission condition for the up channel of the line $B_1$. The data transmission condition determined is sent by the data transmission condition transmission section 1 to the ATM communication device 20. The ATM communication device 20 determines a data transmission condition for the up channel of the line A based on the transmitted data transmission condition, and sends it to the terminals 10 and 11.

The data transmission condition determination section 4 also determines a data transmission condition for the down channel of the line $B_2$. The data transmission condition determined is sent by the data transmission condition transmission section 1 to the ATM communication device 30. The ATM communication device 30 determines a data transmission condition for the down channel of the line C based on the transmitted data transmission condition, and sends it to the terminals 40 and 41.

What is claimed is:

1. A data transfer system comprising a first communication device, a second communication device connected thereto via a first line, a third communication device connected thereto via a second line, and a fourth communication device connected thereto via a third line, wherein if a data transfer direction from said first communication device to said fourth communication device is defined as an up direction and a data transfer direction from said fourth communication device to said first communication device is defined as a down direction, said second communication device includes:

an actual data transmission condition acquisition section for monitoring data on a circuit for an up channel of said second line, and detecting actual data length time ($_u d_{Br}$) and data transmission time interval ($_u t_{Br}$) to obtain the actual data length time ($_u d_{Br}$) and data transmission time interval ($_u t_{Br}$) from the circuit for the up channel, a busy condition occurrence determination section for comparing maximum data length time ($_u d_{Bm}$) and data transmission time interval ($_u t_{Bm}$) for the up channel of the second line which is already stored in the second communication device or the busy condition occurrence determination section to said actual data length time ($_u d_{Br}$) and data transmission time interval ($_u t_{Br}$) for the up channel of the second line which is obtained by said actual data transmission condition acquisition section to determine whether or not a busy condition is occurring on the up channel of the second line and to obtain values of the differences between said maximum data length time ($_u d_{Bm}$) and data transmission time interval ($_u t_{Bm}$) and said actual length time ($_u d_{Br}$) and data transmission time interval ($_u t_{Br}$), respectively;

a data transmission condition determination section for determining a data length time ($_u d_A$) and data transmission time interval ($_u t_A$) for an up channel of the first line, which allows data to be transferred without causing a busy condition in the data transfer on the up channel of said second line, based on the results output by the busy condition occurrence determination section and using a specified allocation criteria, and a data transmission condition transmission section for transmitting said data length time ($_u d_A$) and data transmission time interval ($_u t_A$) determined by the said data transmission condition determining section to said first communication device; and said first communication device includes:

a data transmission condition reception section for receiving said data length time ($_u d_A$) and data transmission time interval ($_u t_A$) for the up channel of said first line, which is transmitted by said second communication device, and a data transmission condition transmission section for enabling data transmission according to said data length time ($_u d_A$) and data transmission time interval ($_u t_A$) received by the data transmission condition reception section.

2. A data transfer system according to claim 1 wherein said data transmission condition transmission section of said second communication device has a data transmission condition management table for storing said data length time ($_u d_A$) and data transmission time interval ($_u t_A$).

3. A data transfer system according to claim 1 wherein said data transmission condition acquisition section of said second communication device provides electric synchronization in layer 1 and detects and identifies a digital signal unit.

4. A data transfer system according to claim 3 wherein said digital signal unit is a frame and said actual data transmission condition acquisition second of said second communication device detects and identifies the frame by detecting a flag in each frame.

5. A data transfer system according to claim 3 wherein said digital signal unit is a cell and said actual data transmission condition acquisition second of said second communication device detects and identifies the cell by detecting a header in each cell.

6. A data transfer system according to claim 1 wherein said busy condition occurrence determination section of said second communication device calculates equation (1), $$_u d_{Bm} - _u d_{Br} = X \tag{1}$$

where $_u d_{Bm}$ is the maximum data length time for the up channel of the second line and $_u d_{Br}$ is the actual data length time for the up channel of the second line, and if in equation (1), X is 0 or a positive value, calculates equation (2), $$({}_u d_{Bm} + {}_u t_{Bm}) - ({}_u d_{Br} + {}_u t_{Br}) = Z \qquad (2)$$

where ${}_u d_{Bm}$ and ${}_u d_{Br}$ are as defined above, ${}_u t_{Bm}$ is the maximum data transmission time interval for the up channel of the second line and ${}_u t_{Br}$ is the actual data transmission time interval for the up channel of the second line, and if in equation (2), Z is 0 or a positive value, determines that a busy condition is not occurring, and if in equation (1), X is a negative value, calculates equation (3), $$({}_u d_{Bm} + {}_u t_{Bm}) - ({}_u d_{Br} + {}_u t_{Br}) = Y \qquad (3)$$

wherein ${}_u d_{Bm}$, ${}_u t_{Bm}$, ${}_u d_{Br}$ and ${}_u t_{Br}$ are as defined above, and if in equation (3), Y is 0 or a positive value, determines that a busy condition is not occurring, and if in equation (3), Y is a negative value or if in equation (2), Z is a negative value, determines that a busy condition is occurring.

7. A data transfer system according to claim 1 wherein said data transmission condition determination section of said second communication device calculates equation (1), $$_u d_{Bs} - {}_u d_{Br} = X \qquad (1)$$

where ${}_u d_{Bs}$ is a safe data length time with a margin on a safer side than the maximum data length time for the up channel of the second line and ${}_u d_{Br}$ is the actual data length time for the up channel of the second line, and if in equation (1), X is 0 or a positive value, calculates equation (2), $$({}_u d_{Bs} + {}_u t_{Bs}) + ({}_u d_{Br} + {}_u t_{Br}) = Z \qquad (2)$$

where ${}_u d_{Bs}$ and ${}_u d_{Br}$ are as defined above, ${}_u t_{Bs}$ is a safe data transmission time interval with a margin on the safer side than the maximum data transmission time interval for the up channel of the second line and utBr is the actual data transmission time interval for the up channel of the second line, and if in equation (2), Z is 0 or a positive value, determines that a busy condition is not occurring, and if in equation (1), X is a negative value, calculates equation (3), $$({}_u d_{Bs} + {}_u t_{Bs}) - ({}_u d_{Br} + {}_u t_{Br}) = Y \qquad (3)$$

where ${}_u d_{Bs}$, ${}_u t_{Bs}$, ${}_u d_{Br}$ and ${}_u t_{Br}$ are as defined above, and if in equation (3), Y is 0 or a positive value, determines that a busy condition is not occurring, and if in equation (3), Y is a negative value or if in equation (2), Z is a negative value, determines that a busy condition is occurring.

8. A data transfer system according to claim 1 wherein if data transmitted across the up channel of said first line can occupy the up channel of said second channel, said data transmission condition determination section of said second communication device adopts as the specified allocation criteria, the relationship $$_u d_{Ai} + {}_u t_{Ai} = {}_u d_{Bs} + {}_u t_{Bs}$$

where ${}_u d_{Ai}$, ${}_u t_{Ai}$, ${}_u d_{Bs}$, and ${}_u t_{Bs}$ are data length time in a data transmission condition for the up channel of said first line, a data transmission time interval in a data transmission condition for the up channel of said first line, a data length time in a data transmission condition for the up channel of said second line, and a data transmission time interval in a data transmission condition for the up channel of said second line, respectively.

9. A data transfer system according to claim 1 wherein said second communication device is connected to first communication devices of n in number, and if data transmitted across up channels of said first lines of n in number can occupy the up channel of said second line, said data transmission condition determination section of the second communication device adopts as the specified allocation criteria, the relationship $$\Sigma({}_u d_{Ai} + {}_u t_{Ai}) = {}_u d_{Bs} + {}_u t_{Bs}$$

where ${}_u d_{Ai}$, ${}_u t_{Ai}$, ${}_u d_{Bs}$, and ${}_u t_{Bs}$ are data length time in a data transmission condition for the up channel of said i-th first line, a data transmission time interval in a data transmission condition for the up channel of said i-th first line, data length time in a data transmission condition for the up channel of said second line, and a data transmission time interval in a data transmission condition for the up channel of said second line, respectively.

10. A data transfer system according to claim 9 wherein the sum of said ${}_u d_{Ai}$ and ${}_u t_{Ai}$ is determined by the following uniform relationship, $$({}_u d_{A1} + {}_u t_{A1}) = ({}_u d_{A2} + {}_u t_{A2}) = \ldots = ({}_u d_{Ai} + {}_u t_{Ai}) = ({}_u d_{An} + {}_u t_{An}).$$

11. A data transfer system according to claim 9 wherein the sum of said ${}_u d_{Ai}$ and ${}_u t_{Ai}$ is given in such a way that a priority ordinal relationship thereof is reflected in $\Sigma d_{Ai}$ that is the sum of the amount of data bits transmitted per unit time.

12. A data transfer system according to claim 11 wherein the sum of said ${}_u d_{Ai}$ and ${}_u t_{Ai}$ has the ordinal relationship established based on the performance of said first communication device.

13. A data transfer system according to claim 11 wherein the sum of said ${}_u d_{Ai}$ and ${}_u t_{Ai}$ has the priority ordinal relationship established based on the operation of said first communication device.

14. A data transfer system according to claim 11 wherein the sum of said ${}_u d_{Ai}$ and ${}_u t_{Ai}$ has the priority ordinal relationship established based on the performance of said fourth communication device.

15. A data transfer system according to claim 11 wherein the sum of said ${}_u d_{Ai}$ and ${}_u t_{Ai}$ has the priority ordinal relationship established based on the operation of said fourth communication device.

16. A data transfer system according to claim 11 wherein the sum of said ${}_u d_{Ai}$ and ${}_u t_{Ai}$ has the priority ordinal relationship established based on the performance of said first line.

17. A data transfer system according to claim 11 wherein the sum of said ${}_u d_{Ai}$ and ${}_u t_{Ai}$ has the priority ordinal relationship established based on the operation of said first line.

18. A data transfer system according to claim 11 wherein the sum of said ${}_u d_{Ai}$ and ${}_t A_i$ has the priority ordinal relationship established based on the performance of said third line.

19. A data transfer system according to claim 11 wherein the sum of said ${}_u d_{Ai}$ and ${}_u t_{Ai}$ has the priority ordinal relationship established based on the operation of said third line.

20. A data transfer system according to claim 11 wherein the sum of said ${}_u d_{Ai}$ and ${}_u t_{Ai}$ has the priority ordinal relationship established based on the operation of said second line.

21. A data transfer system according to claim 11 wherein the sum of said $_u d_{Ai}$ and $_u t_{Ai}$ has the priority ordinal relationship established based on the operation of said second line.

22. A data transfer system according to claim 11 wherein the sum of said $_u d_{Ai}$ and $_u t_{Ai}$ has the priority ordinal relationship established based on the data transmission time for said first communication device.

23. A data transfer system according to claim 11 wherein the sum of said $_u d_{Ai}$ and $_u t_{Ai}$ has the priority ordinal relationship established based on the data reception time for said fourth communication device.

24. A data transfer system according to claim 1 wherein the functions of said data transmission condition transmission section, said actual data transmission condition acquisition section, said busy condition occurrence determination section, and said data transmission condition determination section of said second communication device, are applicable to the down channel of said first line, the up and down lines of said second and said third lines.

25. A data transfer system according to claim 24 wherein for better communications, said second communication device connects to a plurality of communication devices that provide a function similar to that of said first communication device, said third communication device connects to a plurality of communication devices that provide a function similar to that of said fourth communication device, and this is applicable to both up and down channels of each line.

26. A data transfer system according to claim 1 wherein if said second and third communication devices use a permanent virtual logical path instead of a call connection processing to set up and down channels in advance between said first communication device and said fourth communication device, the functions of said data transmission condition transmission section, said actual data transmission condition acquisition section, said busy condition occurrence determination section, and said data transmission condition determination section of said second communication device are applicable to the up and down lines of said first, said second, and said third lines.

27. A data transfer system comprising a first communication device, a second communication device connected thereto via a first line, a third communication device connected thereto via a second line, and a fourth communication device connected thereto via a third line, wherein if the data transfer direction from said first communication device to said fourth communication device is defined as an up direction and the data transfer direction from said fourth communication device to said first communication device is defined as a down direction, said third communication device includes:

an actual data transmission condition acquisition section for monitoring received data on a circuit of an up channel of said second line and detecting actual length time (udBr) and data transmission time interval (utBr) to obtain an actual length time (udBr) and data transmission time interval (utBr), and an actual data transmission condition transmission section for transmitting to said second communication device said actual length time (udBr) and data transmission time interval (utBr) obtained by the actual data transmission condition acquisition section;

said second communication device includes:

an actual data transmission condition output section for receiving the actual data length time (udBr) and data transmission time interval (udBr) transmitted from said actual data transmission condition transmission section of said third communication device and outputting the actual data length time (udBr) and data transmission time interval (utBr);

a busy condition occurrence determination section for comparing maximum data length time ($_u d_{Bm}$) and data transmission time interval (utBm) for the up channel of the second line which is already stored in the communication device or the busy condition occurrence determination section to said actual data length time ($_u d_{Br}$) and data transmission time interval ($_u t_{Br}$) for the up channel of the second line which is output by said actual data transmission condition output section to determine whether or not a busy condition is occurring on the up channel of the second line and to obtain values of differences between said maximum data length time (ud$_{Bm}$) and data transmission time interval (ut$_{Bm}$) and said actual length time ($_u d_{Br}$) and data transmission time interval (utBr), respectively;

a data transmission condition determination section for determining a data length time ($_u d_A$) and data transmission time interval ($_u t_A$) for an up channel of the first line which allows data to be transferred efficiently without causing a busy condition in the data transfer on the up channel of said second line, based on the results output by the busy condition occurrence determination section and using a specified allocation criteria, and a data transmission condition transmission section for transmitting said data length time ($_u d_A$) and data transmission time interval ($_u t_A$) determined by the said data transmission condition determining section to said first communication device; and said first communication device includes:

a data transmission condition reception section for receiving said data length time ($_u d_A$) and data transmission time interval ($_{ut A}$) for the up channel of said first line which is transmitted by said second communication device, and a data transmission condition transmission section for enabling data transmission according to said data length time ($_u d_A$) and data transmission time interval ($_u t_A$) received by the data transmission reception section.

28. A data transfer system according to claim 1 or 27 wherein if the use of the up and down channels of said first, said second, or said third lines is charged, the charge is based on data length time (d) and data transmission time interval (t).

29. A data transfer system according to claim 27, wherein the functions of said data transmission condition transmission section, said actual data transmission condition acquisition section, said busy condition occurrence determination section and said data transmission condition determination section are applicable to the down channel of said first line, the up and down lines of said second and said third lines.

30. A data transfer system according to claim 29 wherein for better communications, said second communication device connects to a plurality of communication devices that provide a function similar to that of said fourth communication device, and this is applicable to both up and down channels of each lines.

31. A data transfer system according to claim 29 wherein if said second and third communication devices use a permanent virtual logical path instead of a call connection processing to set up and down channels in advance between said first communication device and said fourth communication device, the functions of said data transmission condition transmission section, said actual data transmission condition acquisition section, said busy condition occurrence determination section and said data transmission condition determination section are applicable to the up and down lines of said first, said second, and said third lines.

* * * * *